(12) United States Patent
Kriegel et al.

(10) Patent No.: US 7,681,020 B2
(45) Date of Patent: Mar. 16, 2010

(54) CONTEXT SWITCHING AND SYNCHRONIZATION

(75) Inventors: Jon K. Kriegel, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/736,936

(22) Filed: Apr. 18, 2007

(65) Prior Publication Data
US 2008/0263339 A1    Oct. 23, 2008

(51) Int. Cl.
*G06F 9/00* (2006.01)
(52) U.S. Cl. .................. 712/228; 711/130; 711/141
(58) Field of Classification Search .................. 712/228; 711/130, 141
See application file for complete search history.

(56) References Cited

U.S. PATENT DOCUMENTS

| 5,123,094 A * | 6/1992 | MacDougall ................. 712/30 |
| 5,590,338 A * | 12/1996 | Parks et al. ................. 710/269 |
| 5,652,885 A * | 7/1997 | Reed et al. ................... 713/1 |
| 6,385,659 B1 * | 5/2002 | Tuel, Jr. ...................... 719/313 |
| 7,424,599 B2 * | 9/2008 | Kissell et al. ................ 712/228 |
| 2005/0125795 A1 * | 6/2005 | Kissell ........................ 718/100 |
| 2005/0204000 A1 * | 9/2005 | Meiri et al. .................. 709/205 |
| 2007/0050561 A1 * | 3/2007 | Alsup .......................... 711/145 |
| 2007/0226735 A1 * | 9/2007 | Nguyen et al. ................. 718/1 |
| 2008/0028154 A1 * | 1/2008 | Hoover et al. ............... 711/130 |
| 2008/0028403 A1 * | 1/2008 | Hoover et al. ............... 718/100 |
| 2008/0216073 A1 * | 9/2008 | Yates et al. .................. 718/100 |

* cited by examiner

*Primary Examiner*—Eddie P Chan
*Assistant Examiner*—Idriss N Alrobaye
(74) *Attorney, Agent, or Firm*—Patterson & Sheridan, LLP

(57) ABSTRACT

A method, computer-readable medium, and apparatus for context switching between a first thread and a second thread. The method includes detecting an exception, wherein the exception is generated in response to receiving a packet of information directed to one of the first thread and the second thread, and in response to detecting the exception, invoking an exception handler. The exception handler is configured to execute one or more instructions removing access to at least a portion of a processor cache. The portion of the processor cache contains cached information for the first thread using a first address translation. Removing access to the portion of the processor cache prevents the second thread using a second address translation from accessing the cached information in the processor cache. The exception handler is also configured to branch to at least one of the first thread and the second thread.

18 Claims, 16 Drawing Sheets

CONTEXT SWITCHING AND SYNCHRONIZATION

BACKGROUND OF THE INVENTION

1. Field of the Invention

Embodiments of the present invention generally relate to computer processors.

2. Description of the Related Art

Modern computer systems typically include a processor which may access a volatile memory and other memory devices such as a hard drive. For example, the hard drive may provide relatively slow access to larger amounts of information while the volatile memory may provide relatively fast access to smaller amounts of information. Thus, the volatile memory may be used to temporarily store and access a portion of the information stored on the hard drive. In order to further increase the speed with which memory is accessed, a portion of the information accessed by the processor may also be stored within a cache within the processor. The cache may be smaller than the volatile memory while providing relatively faster access to the information stored therein.

In order to allow a thread executed by the processor to access the large amount of information stored on the hard drive using the relatively smaller cache, the computer system may provide address translation to translate between an effective address used by the thread and a virtual address space. The virtual address space may be large enough to address the entire range of memory addresses in the computer system. The virtual address may in turn be translated to a real address in order to use the real address to access the processor cache.

In some cases, the processor may also be configured to execute multiple threads simultaneously (referred to as multithreading). Also, each thread may use different mappings between effective, virtual, and real addresses. For example, during execution of a first thread, the first thread may use a first virtual address to load information from the hard drive into a first real address within the processor cache. The processor may then begin executing a second thread. The second thread may use a second virtual address which maps to different information from the hard drive. In some cases, the second virtual address may also map to the same real address (the first real address) used by the first thread to store information in the processor cache.

Thus, when the second thread begins execution, the processor cache may appear to contain information corresponding to the second virtual address when, in fact, the information in the cache, previously fetched for the first thread, is incorrect and outdated (e.g., stale). Because the processor cache may contain incorrect information with respect to the second virtual address requested by the second thread, execution of the second thread using the incorrect information may result in an error.

Accordingly, what is needed is an improved method, computer-readable medium, and apparatus for executing threads in a computer system.

SUMMARY OF THE INVENTION

Embodiments of the invention provide a method, computer-readable medium, and apparatus for context switching between a first thread and a second thread. In one embodiment, the method includes detecting an exception, wherein the exception is generated in response to receiving a packet of information directed to one of the first thread and the second thread, and in response to detecting the exception, invoking an exception handler. The exception handler is configured to execute one or more instructions removing access to at least a portion of a processor cache. The portion of the processor cache contains cached information for the first thread using a first address translation. Removing access to the portion of the processor cache prevents the second thread using a second address translation from accessing the cached information in the processor cache. The exception handler is also configured to branch to at least one of the first thread and the second thread.

One embodiment of the invention provides a computer-readable storage medium including instructions, which, when executed by a processor, are configured to perform an operation. The operation includes detecting an exception, wherein the exception is generated in response to receiving a packet of information directed to one of the first thread and the second thread, and in response to detecting the exception, invoking an exception handler. The exception handler is configured to execute one or more instructions Removing access to at least a portion of a processor cache. The portion of the processor cache contains cached information for a first thread using a first address translation. Removing access to the portion of the processor cache thereby prevents a second thread using a second address translation from accessing the cached information in the processor cache. The exception handler is also configured to branch to at least one of the first thread and the second thread.

One embodiment of the invention also provides a computer system comprising. The computer system includes a computer readable storage medium including one or more instructions and a processor. The processor includes a processor cache circuitry. The circuitry, when executing the one or more instructions, is configured to detect an exception, wherein the exception is generated in response to receiving a packet of information directed to one of the first thread and the second thread, and in response to detecting the exception, invoke an exception handler. The exception handler is configured to execute one or more instructions removing access to at least a portion of the processor cache. The portion of the processor cache contains cached information for a first thread using a first address translation. Removing access to the portion of the processor cache thereby prevents a second thread using a second address translation from accessing the cached information in the processor cache. The exception handler is further configured to branch to at least one of the first thread and the second thread.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
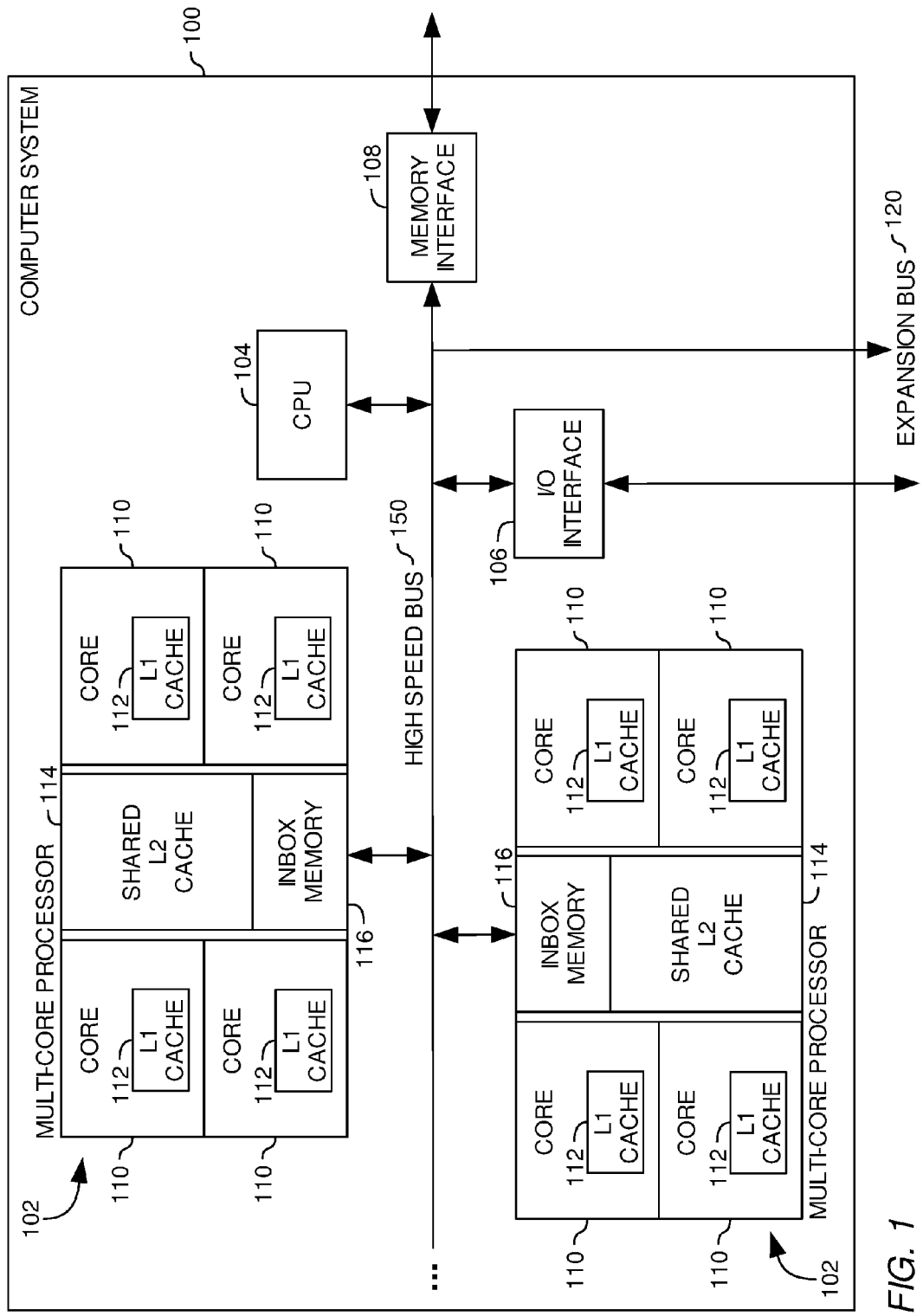
FIG. 1 is a block diagram depicting an exemplary computer processor according to one embodiment of the invention.

Embodiments of the present invention generally provide a method, computer-readable medium, and apparatus for context switching between a first thread and a second thread. In one embodiment, the method includes detecting an exception, wherein the exception is generated in response to receiving a packet of information directed to one of the first thread and the second thread, and in response to detecting the exception, invoking an exception handler. The exception handler is configured to execute one or more instructions removing access to at least a portion of a processor cache. The portion of the processor cache contains cached information for the first thread using a first address translation. Removing access to the portion of the processor cache prevents the second thread using a second address translation from accessing the cached information in the processor cache. The exception handler is also configured to branch to at least one of the first thread and the second thread.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module). Furthermore, while described below with respect to a processor having multiple processor cores and multiple L1 caches, embodiments of the invention may be utilized with any processor which utilizes a cache, including processors which have a single processing core. In general, embodiments of the invention may be utilized with any processor and are not limited to any specific configuration.

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain a one or more multi-core processors 102. Each multi-core unit 102 may include multiple cores 110 each arranged around a shared level two cache (L2 cache) 114. The shared L2 cache 114 may include a portion of memory, referred to herein as inbox memory 116, which, as described below, may be used to manage memory access for threads being executed by the cores 110 in the multi-core unit 102. Each core 110 may also include a level one cache (L1 cache) 112 which, in some cases, may be used exclusively by that core 110.

In some cases, the system 100 may also include a further central processing unit (CPU) 104 which, in some cases, may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

Using Inbox Memory in a Processor

In some cases, efficient allocation of memory among multiple threads executing concurrently in a processor 102 may be desired in order to improve performance of the processor 102. Furthermore, transmitting instructions and data between concurrently executing threads may be difficult where cache space is shared among multiple threads.

One embodiment of the invention provides memory space in a cache, referred to as a memory inbox, which may be assigned to a given thread (referred to herein as the owner thread) being executed in a multithreading processor such as the multi-core processor 102. In one embodiment of the invention, the memory space for the inbox may be allocated exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread, for example, by writing to an address or sending a packet to an address corresponding to the inbox of the other thread (e.g., by using the inbox of another thread as an outbox), or by using specialized circuitry (e.g., an outbox buffer and/or hardware for the sending thread) to send the data. Thus, the inbox memory may be used to simplify communication between a sending and a receiving thread while preventing displacement of data and/or instructions being used by other threads.

Figure 2A:
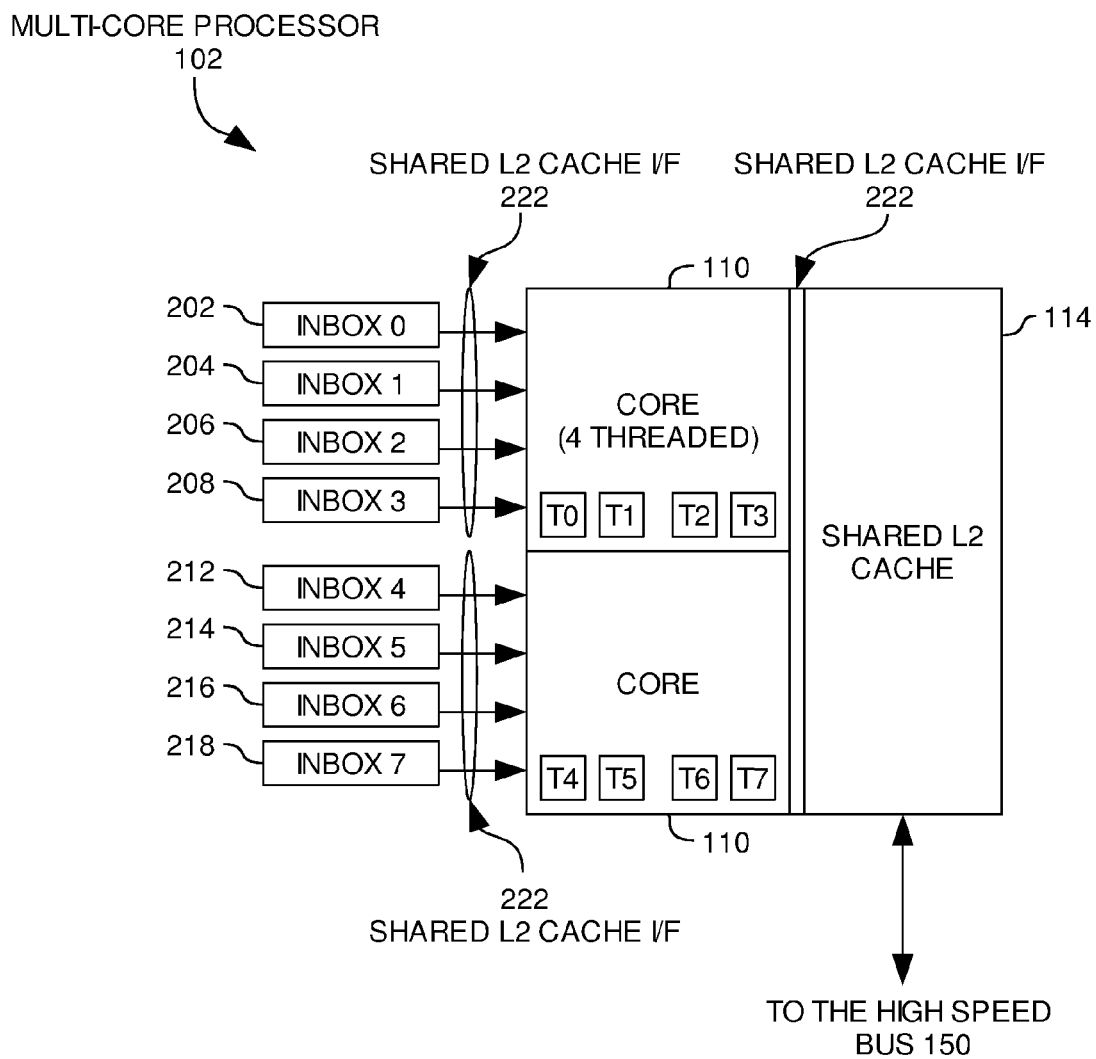
FIGS. 2A-D are block diagrams illustrating aspects of memory inboxes according to one embodiments of the invention.

FIG. 2A is a block diagram of memory inboxes 202 . . . 218 in a multi-core processor 102 processor according to one embodiment of the invention. The depiction of the memory inboxes 202 . . . 218 is intended to be a conceptual view and therefore is not limited to any particular physical configuration. As depicted, threads (e.g., threads T0-T7) executing in each core 110 may have access to the shared L2 cache 114 via a shared L2 cache interface 222. Furthermore, the L2 cache interface 222 may also be used by the threads T0 . . . T7 to access the corresponding memory inboxes 202 . . . 218. As described above, in some cases, each inbox 202 . . . 218 may be assigned to a corresponding thread T0-T7. Thus, Inbox 0 202 may be assigned to thread T0 and so on. In some cases, by assigning a given inbox to a given thread, access to the assigned inbox may be unrestricted with respect to the owner thread while access by other threads may be restricted. Exemplary restrictions are described below in greater detail.

Figure 2B:
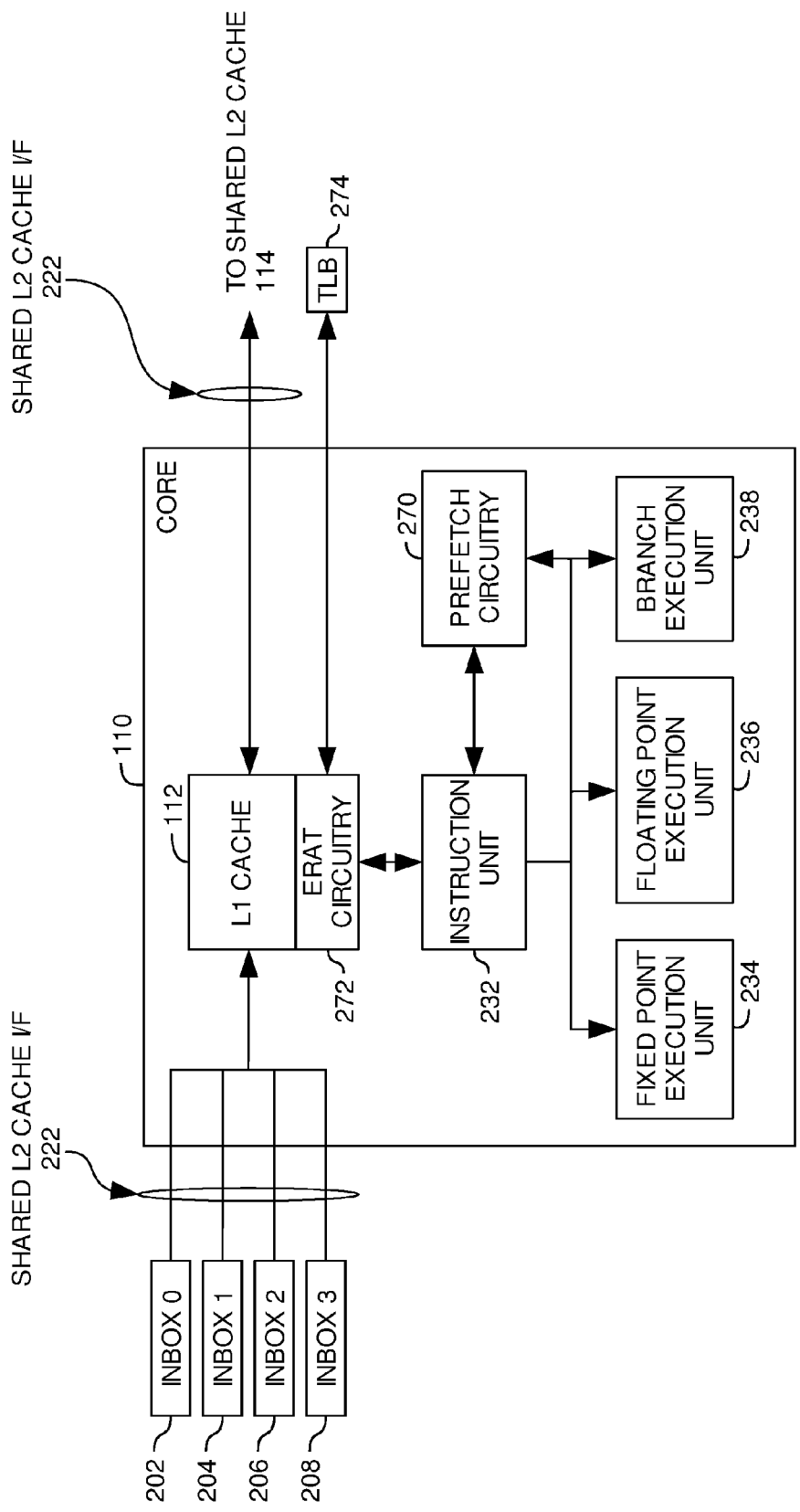

FIG. 2B is a block diagram depicting the path of data from memory inboxes (e.g., inboxes 202 . . . 208) and the shared L2 cache 114 transmitted to and from a processing core 110. As described above, both the memory inboxes 202 . . . 208 and the shared L2 cache 114 may be accessed via the shared L2 cache interface 222. Where a thread being executed in the core 110 retrieves data from an inbox 202 . . . 208 or from the shared L2 cache 114, the retrieved data may be placed in the L1 cache 112 for the core 110. Instructions for the thread may be issued from an instruction unit 232. As described above, in some cases, the core 110 may be configured to execute multiple threads concurrently. Thus, the instruction unit 232 may be configured to issue instructions for multiple threads. In some cases, the core 110 may provide multiple execution units 234 . . . 238 which may be used to concurrently execute threads in the core 110. The execution units 234 . . . 238 may include a fixed point execution unit 234, a floating point execution unit 236, and a branch execution unit 238.

In one embodiment, the core 110 may also be configured to speculatively prefetch instructions for one or more threads being executed using prefetch circuitry 270. For example, the prefetch circuitry 270 may begin fetching instructions beginning from the current instruction being executed (e.g., as indicated by the instruction unit) and speculatively fetch instructions which may subsequently be executed by the core 110 as indicated by the current instruction address and by the branch execution unit 238. If the correct instructions have been prefetched (e.g., from main memory or from the L2 cache 114) into the L1 cache 112, then, in some cases, execution of the prefetched instructions may be performed more quickly than if the instructions had not been prefetched. For example, where the instructions have not been prefetched, subsequent fetching, when the instructions are requested by the instruction unit 232, may be needed.

In one embodiment, the multi-core processor 102 and core 110 may also include circuitry for performing address translation. For example, threads being executed in the core 110 may use effective addresses when accessing data. In some cases, the effective addresses may be mapped to virtual addresses which are in turn mapped to real addresses. The real addresses may then be used to access the memory subsystem (e.g., the L1 cache 112 and the shared L2 cache 114). The translation from an effective address to a virtual address to a real address may be performed, for example, using effective to real address translation (ERAT) circuitry 272. Furthermore, the mapping between effective, virtual and real addresses may be defined, in part, using a page table. The page table may be stored, for example, on a hard drive or in a memory device (e.g., main memory). The page table may also be at least partially stored in a translation look-aside buffer (TLB) 274. In some cases, as described below, threads executed by the process 102 may be configured to modify address mappings in the page table and TLB 274 such that different threads utilize different mappings between effective, virtual, and real addresses.

In one embodiment of the invention, inboxes may only be used for receiving data from other threads (e.g., the other threads may write data and/or send data directly between inboxes). In some cases, an inbox may also be used to send data. For example, data and/or packets to be sent by the thread may be placed in the inbox and inbox circuitry may then send the data to a receiving inbox. Optionally, in one embodiment, a separate buffer, referred to as an outbox, may be used by each thread to send data from a sending thread to the inbox of a receiving thread.

Figure 2C:
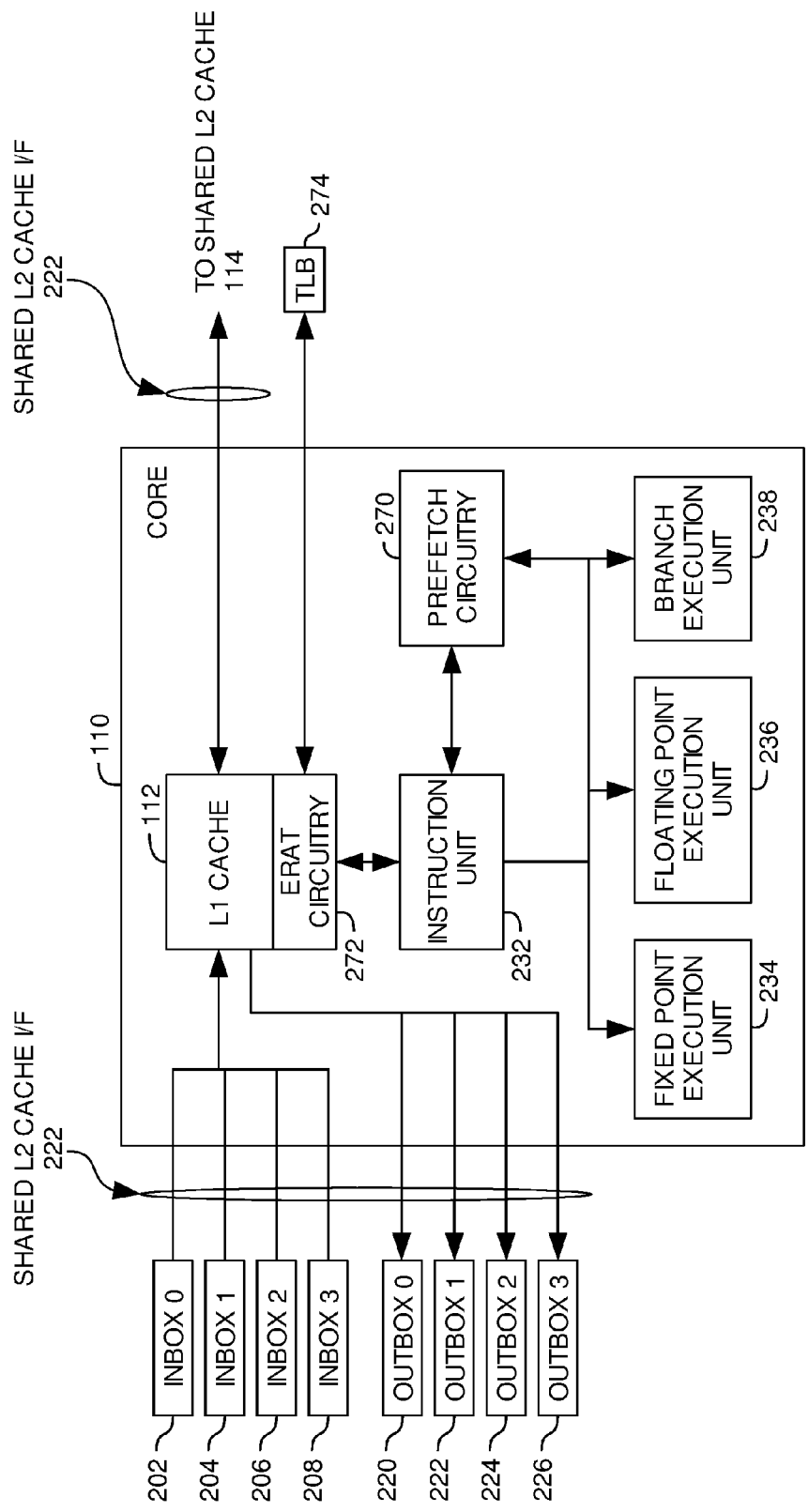

FIG. 2C is a block diagram depicting exemplary inboxes and outboxes according to one embodiment of the invention. In one embodiment of the invention, each outbox may be associated with a given owner thread. Thus, in some cases, the memory space for each outbox may be allocated exclusively to the owner thread of the outbox. The outboxes may be accessed via the shared L2 cache interface 222 as depicted. As described below in greater detail, the outbox memory space may be used by a sending thread to communicate with inboxes of receiving threads. While described with respect to inboxes and/or outboxes which form a part of the L2 cache 114, embodiments of the invention may be utilized with any type of memory (e.g., a separate buffer) accessible via any method known to those skilled in the art (e.g., memory mapping, registers, etc.).

As described herein, the inboxes and/or outboxes may be used in addition to a traditional memory management system to manipulate data in the computer system 100. For example, in some cases, a thread may update or produce data which is to be accessed later (e.g., by the same thread or by another thread). Where the updated data is to be accessed later, the thread may place the updated data in the L1 cache 112. Furthermore, where desired, the updated data may also be placed in the L2 cache 114 or in an inbox 202 . . . 208 for the updating thread via the shared L2 cache interface 222. In some cases, as described above, direct access to a given inbox (e.g., inbox 0 202) via the shared L2 cache interface 222 may be limited to the thread (e.g., thread T0) which owns the given inbox.

In one embodiment of the invention, memory space within a memory inbox (or outbox, where implemented) may be mapped to a global memory address (e.g., all levels of memory including the L1 cache 112, L2 cache 114, and main memory as well as all threads may use the same global memory address to access a given memory inbox). Thus, in one embodiment of the invention, to access the inbox memory space, the owner thread may merely read or write the desired information to a global memory address corresponding to the inbox memory space. As described below, where a thread which does not own the memory inbox attempts to directly access the inbox via the global memory address, the access may be denied. Other forms of access may instead be provided to other non-owning threads, e.g., via packetized messages sent to the inbox.

Also, in one embodiment of the invention, information being stored in a memory inbox and/or outbox may be local such that the memory being accessed is not cacheable. For example, while information in the L1 cache 112, L2 cache 114, and other memory level may be automatically cached by the multi-core processor 102 such that information requested from a given memory address may be automatically fetched from main memory and maintained in one of the cache levels 112, 114 while being accessed. In contrast, the globally addressable memory in a given inbox may only be located in the inbox and may not be moved between different levels of the memory hierarchy (e.g., the main memory, the shared L2 cache memory 114, or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below (e.g., received packets or packets being sent may also be placed in non-cacheable memory). Where outboxes are utilized, accesses to each outbox may also be made to non-cacheable memory. Furthermore, in an alternate embodiment of the invention, information stored in the inbox or outbox may be cached in other levels of the memory hierarchy.

In one embodiment of the invention, the physical memory used for inbox/outbox buffer structures could also be implemented as "locked" sets of a cache level such as the L2 cache 114. For example, cache sets in the L2 cache 114 may be reserved specifically for one or more memory inboxes and/or outboxes and may not be eligible for cast out replacement like other cache sets. The reserved cache sets may, for example, be permanently reserved during manufacturing or, optionally, may be dynamically reserved during execution.

Assignment of Memory Inboxes/Outboxes

Figure 2D:
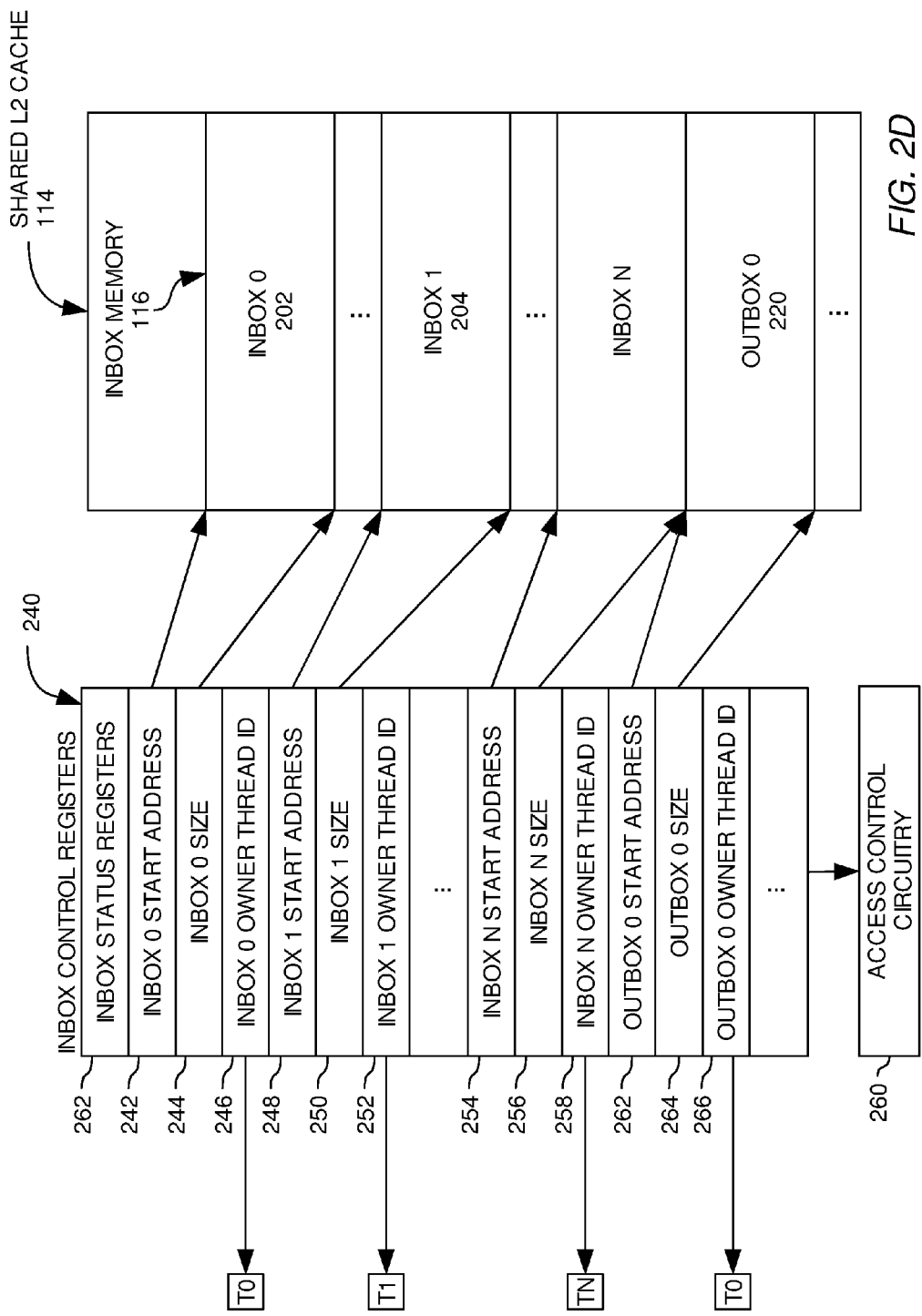

In one embodiment of the invention, memory inboxes and/or outboxes may be provided from the shared L2 cache 114 (e.g., a portion of the L2 cache 114 may be reserved for the inbox memory 116). FIG. 2D is a block diagram depicting inbox memory 116 partitioned from the shared L2 cache 114 into inboxes 202, 204, etc. and outboxes 220, etc. according to one embodiment of the invention.

As depicted, the size and location of each inbox 202, 204, etc. and/or outbox 220, etc. may be controlled by inbox control registers 240. The status of each inbox 202, 204, etc. and/or outbox 220, etc. (e.g., enabled or disabled) may be indicated and/or modified via inbox status registers 262. In one embodiment, access to the inbox control registers 240 may be unrestricted. Optionally, in some cases, access to the inbox control registers 240 may be limited, for example, to a subset of approved threads (e.g., the owner thread, a parent of the owner thread, a specially designated control thread, and/or an operating system kernel thread). In one embodiment, the inbox control registers 240 may include a start address register 242, 248 . . . 254, a size register 244, 250 . . . 256, and an owner thread identification register 246, 252 . . . 258. Corresponding registers 262, 264, 266 may also be provided to indicate the start address, size, and thread identification for each of the outboxes 220, etc.

In one embodiment, the start address registers 242, 248 . . . 254 may indicate a start address for each inbox 202, 204, etc. The size registers 244, 250 . . . 258 may indicate the size of a corresponding inbox 202, 204, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 244, 250 . . . 258 may indicate the size in kilobytes).

In one embodiment, the owner thread identification register 246, 252 . . . 258 may identify which thread (e.g., thread T0, T1 . . . TN) owns a given inbox 202, 204, etc. or outbox 220, etc. While depicted with respect to threads and corresponding inboxes 1, 2 . . . N, embodiment of the invention may be used with any type of thread and/or inbox identification (e.g., a number, an address, etc.). In one embodiment of the invention, the inbox identification register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 260 may be used to provide the restricted access.

In some cases, the inbox control registers 240 may be arranged differently than depicted in FIG. 2C, for example by adding or removing control registers. For example, where the inboxes 202, 204, etc. and/or outboxes 220, etc. are arranged in contiguous memory addresses, the control registers may merely include a start address register 242 for the first inbox (e.g., Inbox 0 202) and a size register 244, 250, 256 for each inbox 202, 204, etc. The bounds for a given inbox may then be determined by adding the size of each preceding inbox to the start address for the first inbox. Optionally, in one embodiment, a register may be provided for the start address of each inbox and/or outbox, and each inbox may occupy a predefined range of memory addresses beginning from the start address. In other embodiments, the inboxes 202, 204, etc. and/or outboxes 220, etc may also be provided at fixed locations with fixed sizes such that a process for allocating inbox memory space is not utilized.

Access to Memory Inboxes/Outboxes

In one embodiment of the invention, access to a given memory inbox (and/or outbox, for each of the examples described herein) may be restricted, for example, with respect to types of access, modes of access, and threads which are allowed access. In some cases, multiple access modes may be provided with different restrictions. For example, one mode of access may be direct requests to access inbox memory space. Another mode of access may be access to the inbox via packetized request messages. As described above, by providing limited access to the inbox, the owner thread of the inbox may maintain enough memory space within the inbox to cache its own instructions and data without other having other competing threads displace the owner thread's instructions and data.

In one embodiment of the invention, direct access to a memory address within an inbox memory space (identified, for example, by the start address register and size register) may be limited by access circuitry 260 to the owner thread for the inbox. For example, if a requested memory address falls within the inbox memory space but the access request is not from the owner thread, then a determination may be made of whether the request is from a thread which is approved to access the inbox memory space at step. If the request is not from an approved thread, then the access request may be denied.

In some cases, exclusive access to inbox memory space may also be granted using a lock (e.g., using a register to assign a temporary, exclusive access to inbox memory to a thread which obtains the lock). In such cases, a thread desiring to write to the inbox may obtain the lock (assuming another thread does not already hold the lock). When the thread obtains the lock, the thread may then be granted access to the inbox. After the thread has finished accessing the inbox, the thread may relinquish the lock so other threads may obtain the lock and access the inbox or so the owner thread can access the inbox. As described below, in one embodiment, access request packets may also be used to obtain exclusive write access to a portion of the inbox.

While described above with respect to limiting all types of direct accesses to inbox memory space, in some cases, only certain types of access, such as writing to the inbox memory space, may be limited. In such cases, other accesses such as read accesses may be freely allowed to any thread. Optionally, in one embodiment of the invention, direct access to inbox memory space may not be restricted via hardware to any given thread.

Access to Memory Inboxes Via Packetized Messages

In one embodiment of the invention, access to a given inbox may be provided via packetized messages sent from a thread to the inbox of another thread. The receiving thread may, for example, process received packets in the order received, or, optionally, according to priorities indicated by the received packets. Using packetized messages to transfer data between threads may provide a simple interface for a sending thread to communicate with a receiving thread by automating transmission of data between each of the threads (e.g., the processor may be configured to automatically route the message from the sending thread to the receiving thread). Furthermore, using such messages may provide greater control on the amount of data which is sent to a given thread. In some cases, by limiting the amount of data which is sent to a given thread may provide the thread with a manageable workload without overloading the thread's inbox and consuming memory bandwidth within a processor, as described below.

In general, the write to a given inbox may be performed in any manner known to those skilled in the art. For example, packets may be written to memory mapped control circuitry which sends the packets to a given inbox. Optionally, control registers may be provided which allow a sending thread to indicate data (e.g., at a given memory address) which is to be transferred from a sending thread to the inbox of a receiving thread. As described below, an outbox may also be used to send packets of data from a sending thread to a receiving thread.

Figure 3A:
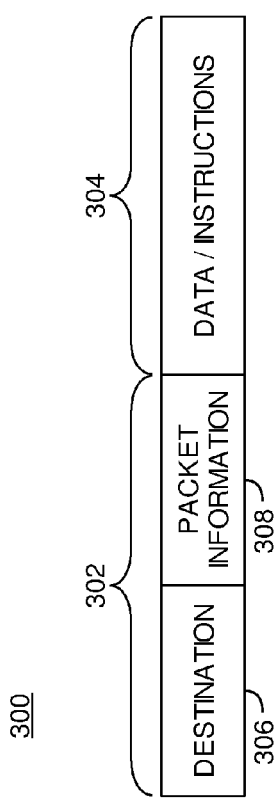
FIGS. 3A-B are block diagrams depicting exemplary packets for communicating with an inbox according to one embodiment of the invention.

FIG. 3A is a block diagram depicting an exemplary packet 300 which may be used to communicate between thread inboxes and/or outboxes in a processor such as the multi-core processor 102 according to one embodiment of the invention. As depicted, the packet 300 may include a header 302 and a body 304. The header 302 may indicate a destination 306 for the packet as well as packet information 308. The packet information may include, for example, parity information, error correcting codes (ECC), packet routing information, packet size information, packet source information (e.g., indicating the sending thread of the packet), or other appropriate information for transmitting the packet. The header 302 may also indicate the packet type, for example, a write request packet, a write data packet, a notification packet, or any other type of packet being used in the system 100. The body 304 may include data and/or instructions. Optionally, in some cases, e.g., in the case of a control packet such as a write request packet or a notification packet, the body 304 may be omitted from the packet.

In one embodiment of the invention, a thread which wants to send information to the inbox of a receiving thread may first send a write request packet to the receiving thread's inbox. The write request packet may be used to determine if there is sufficient space in the receiving thread's inbox to fulfill the write request. By determining if there is sufficient space in the receiving thread's inbox to fulfill the write request, the system 100 may ensure that the receiving thread has sufficient space in its inbox to receive the data to be written. Also, because the receiving thread may remove data from the inbox as the data is processed, the amount of free space in the inbox may indicate how busy the receiving thread is (e.g., a busy thread may have a full inbox). Thus, by determining if the receiving thread has sufficient space in its inbox, the sending thread may determine if the receiving thread has enough time to process the data in its inbox and is not overloaded with data and instructions which cannot be quickly processed.

If there is sufficient space in the receiving thread's inbox to fulfill the write request, the write request may be granted (e.g., by sending a response packet or by setting a notification bit in a register which may be polled by the sending thread) and subsequent data packets may be sent by the sending thread to fulfill the granted write request. After each of the data packets have been sent, a subsequent notification packet may be sent in order to notify the receiving thread that data from the data packets has been placed in an inbox for processing. Optionally, as described below, the sending thread may write to a special register in order to notify the receiving thread that data has been placed in an inbox for processing.

Figure 3B:
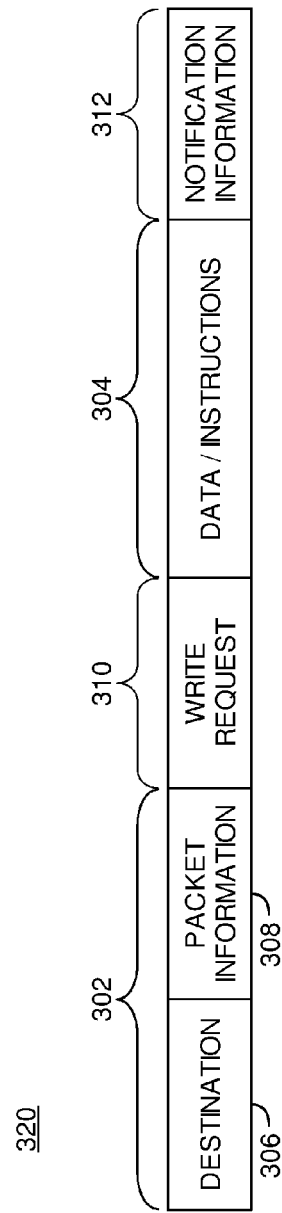

Furthermore, in one embodiment of the invention, as depicted in FIG. 3B, one or more of the functions provided above by the write request packets, data packets, and notification packets may be provided in a single packet 320 which includes a header 302, a write request 310, a body including 304 data and/or instructions, and/or notification information 312 which may be used to notify the receiving thread that new data has been received. As described below, using a single packet to provide the functions otherwise provided by two or more packets may reduce the number of packets needed for inter-thread communication in the computer system 100.

While with respect to write request packets and data packets, embodiments of the invention may also be used without write request packets (e.g., each data packet may include an implicit request to write data to the inbox which may be allowed or denied). Furthermore, embodiments of the invention may also be used with read requests. A read request may include, for example, a read request packet sent from a sending thread to a receiving inbox. If the read request is accepted, the receiving inbox may then send read response packets containing the read data to the inbox of the sending thread.

As described above, in one embodiment, a sending thread may use circuitry and memory associated with an outbox to send data to the inbox of a receiving thread. When using the outbox to send data to the inbox of the receiving thread, the sending thread may deposit data to be sent in the outbox and allow the outbox to perform any tasks related to sending the data. By using the outbox to perform tasks related to sending the data, the processing overhead necessary for the sending thread to send the data to the receiving thread may be reduced. Furthermore, in one embodiment, a single packet may be used to communicate between an outbox and an inbox. For example, outbox circuitry may automatically transfer the single packet to a receiving inbox which may be located at the same processing core 110, at another processing core 100 in the same multi-core processor 102, or at another multi-core processor 102. By using a single packet to communicate between an outbox and an inbox, network traffic between the outbox and inbox may be reduced.

In some cases, an acknowledgement packet may be used to indicate to the outbox whether a packet was successfully transmitted and/or whether a write request provided by the packet was accepted. In some cases, the outbox may retain a copy of the packet in order to resend the packet in the event that the previously sent packet was not accepted by the receiving inbox as described below. Furthermore, in some cases, a timeout may be added to outbox so that the outbox does not wait too long for an acknowledgment packet. Where an acknowledgement packet is not received before the timeout expires, the outbox may presume that the packet was not received and attempt to resend the packet.

In some cases, the acknowledgement packet may provide additional information to an outbox. For example, in one embodiment of the invention, where the acknowledgement packet indicates that a request cannot be granted, the acknowledgment packet may also indicate when the outbox should attempt to resend the request. For example, the inbox may provide a retry time for sending another packet such as a constant time provided to each outbox, an estimated time based on the workload of the receiving thread (e.g., as indicated by how full the inbox is), or a random retry interval (e.g., a live-lock buster) which may be provided to avoid cyclical timing live-locks where threads repeatedly attempt to access the inbox without succeeding. In one embodiment, the outbox may also generate the retry time, e.g., as a constant time, estimated time, or a random retry interval in response to receiving an acknowledgment packet indicating that the request cannot be granted.

In some cases, a negative acknowledgement may also contain a reservation or priority indication which allows the outbox to resend a request at a subsequent time. The subsequent request may include the previously received priority indication (e.g., as a time stamp or as an age of the request) which may be used by the inbox in determining whether to grant the request (e.g., higher priority requests or older requests may be granted first).

Exemplary Circuitry For Managing Inbox Communications

In one embodiment of the invention, the process of communicating between inboxes may be controlled by software. For example, when a write request is made by a requesting thread, the determination of whether to grant the write request may be made by the thread receiving the write request. Furthermore, in one embodiment of the invention, software may be used to communicate inbox data packets between threads. For example, a sending thread may send a request to a control thread (e.g., a kernel thread) to route packets between the sending thread and the receiving thread. The kernel thread may then control the communications necessary to transmit the packets being sent.

Optionally, in one embodiment of the invention, the communication process between threads and inboxes may be performed using hardware (e.g., without executing software instructions). Such hardware may provide network circuitry which automatically routes packets being sent between a thread and inbox. The circuitry for the network may also be used to implement access control as described above.

Figure 4A:
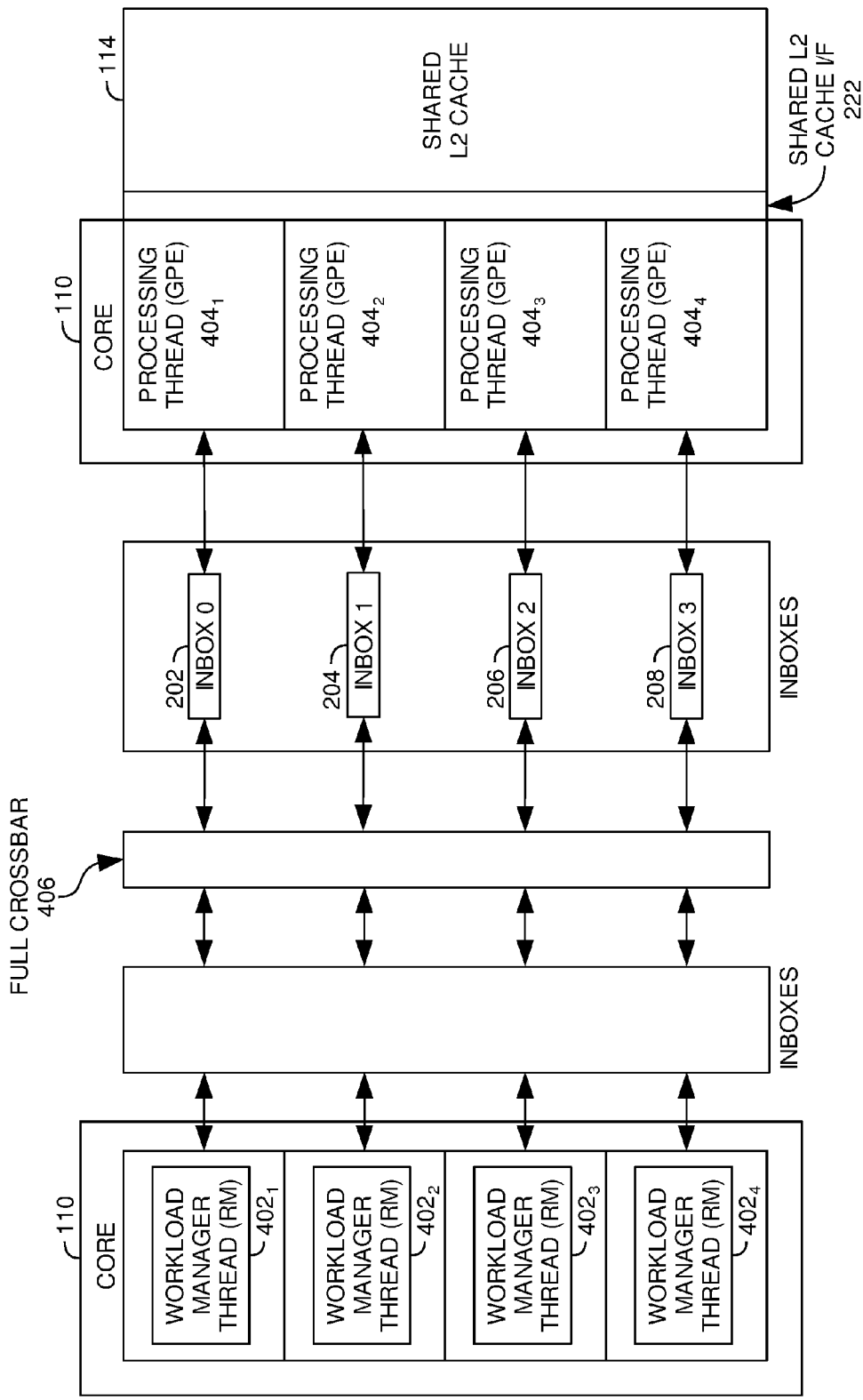
FIGS. 4A-D are block diagrams depicting exemplary circuitry for accessing inboxes according to one embodiment of the invention.

FIG. 4A is a block diagram depicting exemplary network routing circuitry for routing packet between memory inboxes according to one embodiment of the invention. As depicted, the routing circuitry may be used to route data to and from threads in a core 110. In some cases, the routing may be performed between threads in a single core 110, between separate cores 110, or between separate processors 102, 104.

In one embodiment of the invention, the routing circuitry may be used to route data and/or instructions from control threads referred to as workload manager threads 402. The workload manager threads 402 may be used to assign a processing workload to a processing thread 404. For example, where the system 100 is used for graphics processing, the processing workload may include data and/or instructions which may be used to render a portion of a three-dimensional image. If a workload manager thread 402 determines that a given processing thread 404 is overburdened with work (e.g., because the processing thread 404 has a full inbox, as described above), then the workload manager thread 402 may look for another processing thread 402 to assign a given processing workload, or the workload manager thread 402 may wait before assigning additional processing workload to the overburdened processing thread 404.

In one embodiment of the invention, the rendering workload may include data and/or instructions which are used to render a three-dimensional scene via ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

For some embodiments, ray tracing operations may utilize the inbox and outbox mechanisms described herein to transfer information between processing elements when performing ray tracing operations. As described in the commonly owned, co-pending application, U.S. patent application Ser. No. 11/460,797, a first thread on a first processing element (e.g., a workload manager) may traverse a spatial index having nodes defining bounded volumes of the three dimensional scene by taking branches from internal nodes until a leaf node is reached, wherein branches are taken based on whether the ray intersects bounding volumes defined by the nodes.

To expedite subsequent traversal, a traversal history indicating one or more nodes defining bounding volumes the ray intersects and branches taken may be recorded when traversing the spatial index. Outbox control circuitry for the first thread may be used to send information defining the ray to the inbox of the second thread to perform ray-primitive intersection tests. For example, the second thread may perform ray-triangle intersection tests. Threads performing ray-triangle intersection tests may be referred to herein as RT threads, however, embodiments of the invention may be used with any type of thread performing any type of routine. Outbox control circuitry for the second thread may be used to send results of the ray-primitive tests to the inbox of the first thread. If the results of the ray-primitive intersection tests indicate the ray does not hit a primitive contained in the bounding volume defined by the leaf node, the spatial index may be re-traversed using the recorded traversal history.

Where the rendering workload assigned by a workload manager thread 402 is a rendering workload for ray tracing, each workload assigned to a processing thread 404 may include one or more rays which the processing thread 404 may trace through a given scene. The processing thread 404 may then return data about the one or more rays to the workload manager thread 402 which may compile the data for multiple rays from multiple processing threads 404 and use the compiled data to determine the color of one or more pixels corresponding to the rays and display the scene being rendered.

In order to assign a processing workload to any of the processing threads 404, each workload manager 402 may be able to send packets to any of the inboxes 202, 204, 206, 208 corresponding to the separate threads 404. In one embodiment of the invention, a full crossbar 406 (meaning that the workload manager can access all inboxes 202, 204, 206, 208) may be used to route packets from any of the workload manager threads 402 to and from any of the inboxes 202, 204, 206, 208 for any of the corresponding processing threads 404. Furthermore, as depicted with respect to FIG. 4B, where outboxes 220, 222, 224, 226, etc. are used by sending threads to send information to the inboxes 202, 204, 206, 208, etc. of receiving threads, the full crossbar 406 may also be used to perform the transmission.

Figure 4B:
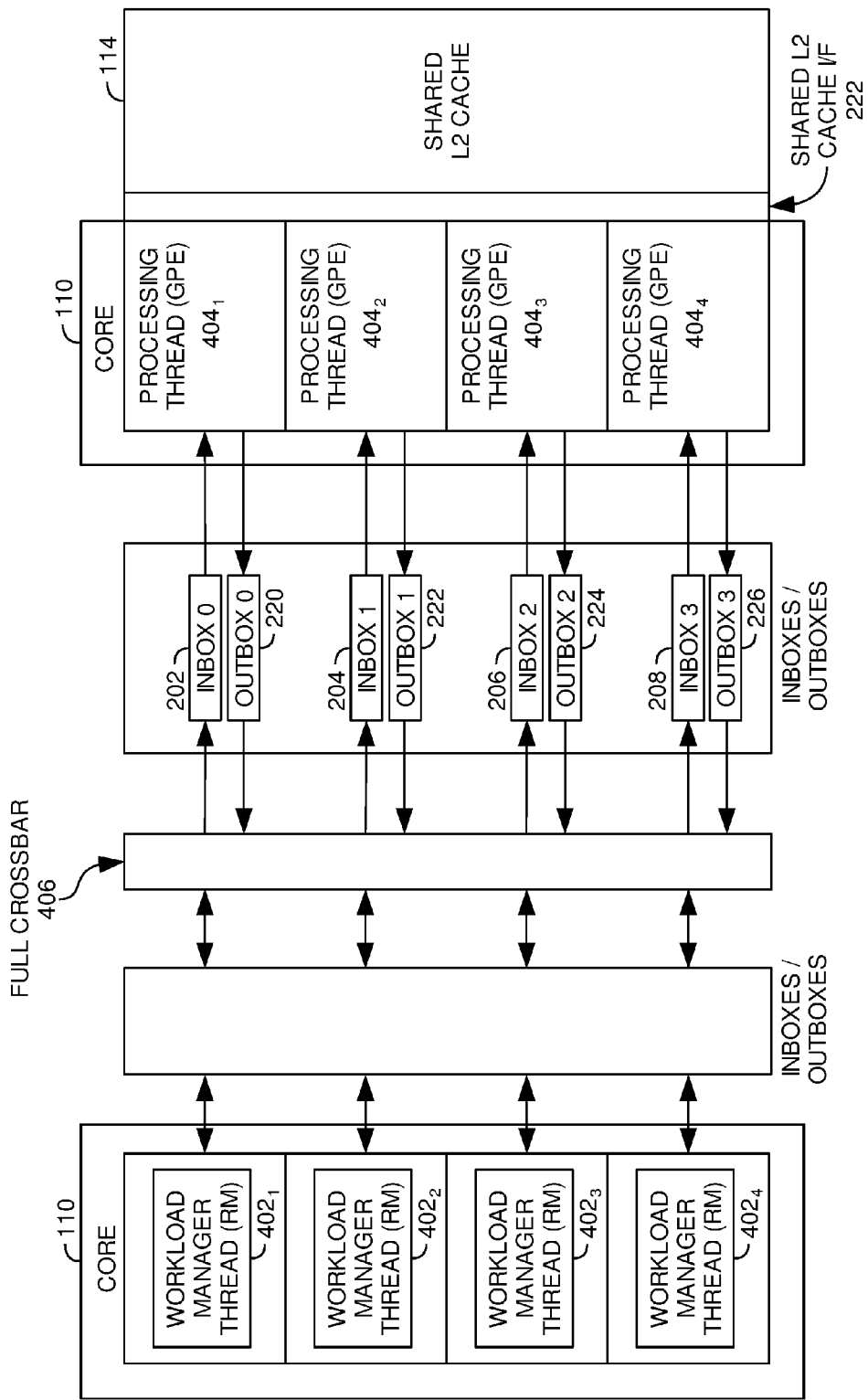

As described above, in one embodiment of the invention, circuitry may be used to automatically determine whether to grant access to an inbox without using software instructions to make the determination. FIG. 4B is a block diagram depicting inbox circuitry according to one embodiment of the invention. As depicted, the inbox 202 may include an allocation register 412 which indicates how much of the inbox memory 420 has been allocated to access requests. Each time an access request is granted, the allocation register 412 may be incremented to indicate that more of the inbox memory 420 has been reserved.

After a processing thread 404 has removed data and/or instructions from the inbox 202 to be processed, the allocation register 412 may be decremented to indicate that additional inbox memory 420 is available. For example, the allocation register 412 may be decremented by the owner thread of the inbox 202 after the owner thread has removed information from the inbox 202 for processing. As described above, where the owner thread accesses information in the inbox 202, in an allocation register 412, or in any other portion of the inbox 202, such accesses may be to local, non-cacheable memory addresses. Optionally, after a packet is read by the owner thread, the allocation register 412 may be automatically decremented by the inbox control circuitry 424. If the inbox 202 is full and a write request is received, the allocation register may return a value (e.g., a predefined constant) which indicates that the inbox 202 is full.

When an access request is received, e.g., via an access request packet, the inbox control circuitry 424 may be configured to automatically determine whether to grant the access request, for example, as described above. An allocation response (e.g., a response packet or a signal, as described above) may be provided to the sending thread to indicate that the memory space has been allocated. In one embodiment, the inbox control circuitry 424 may also be configured to determine whether to accept incoming write data packets and where to place accepted incoming write data packets. The inbox control circuitry 424 may modify inbox control registers 426 for the inbox 202 to indicate, for example, the size and/or location within the inbox memory 420 of the written data. The inbox control circuitry 424 may also provide an inbox interrupt to indicate to the receiving thread that write data has been placed in the inbox memory 420.

Figure 4C:
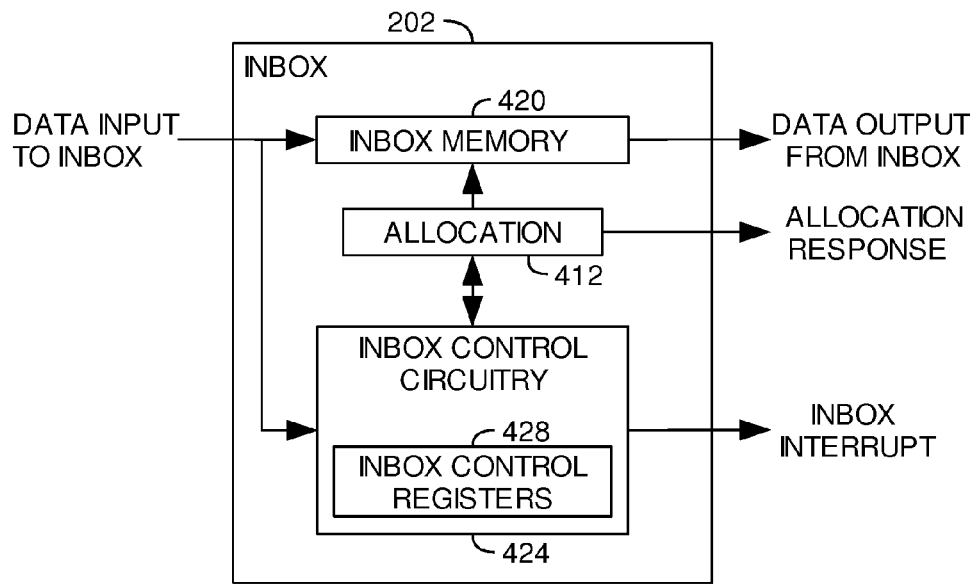
Figure 4D:
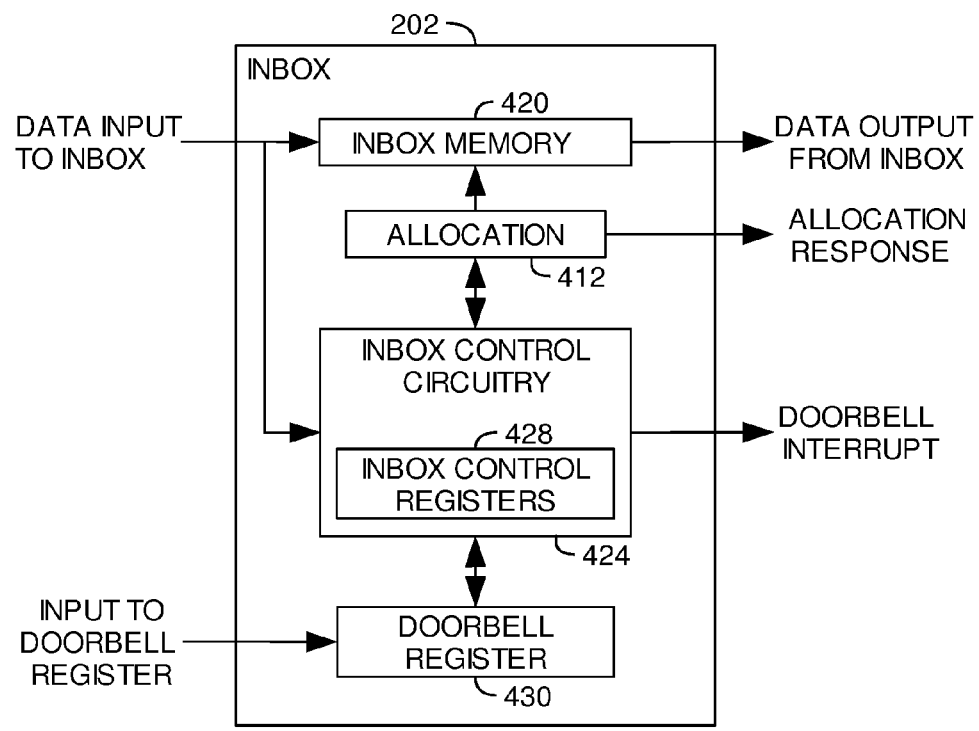

In one embodiment of the invention, a doorbell register 430 may be used to indicate to a receiving thread that an access request has been received as depicted in FIG. 4C. After the access request has been provided to the inbox control circuitry 424, the sending thread may write a value to the doorbell register 430 which indicates that the access request has been sent. Optionally, where a packet 320 is received which contains notification information 312, the packet may be parsed and the notification information may be placed in the doorbell register. Upon receiving the information in the doorbell register 430, the inbox control circuitry 424 may automatically issue a doorbell interrupt to the receiving thread. Upon receiving the doorbell interrupt, the receiving thread may then process all or a portion of the access request. In one embodiment, the doorbell register 430 may be accessed by the owner thread via a local read and/or write.

Optionally, the doorbell register 430 may also be used to indicate that data has been written to the inbox memory 420. For example, after the sending thread has written the write data to the inbox memory 420, the sending thread may write to the doorbell register 430 causing the doorbell interrupt to be issued to the receiving thread. Upon receiving the doorbell interrupt, the receiving thread may, for example, check the inbox control registers 428 to determine where the write data has been written and process the data.

In some cases, information written to the doorbell register 430 may provide a priority level corresponding to the data placed in the inbox memory 420. The priority may be used, for example, to determine whether and/or when to issue an interrupt to the receiving thread. For example, in one embodiment, if the priority of the receiving thread is greater than the priority received in the doorbell register 430, then the receiving thread may not be interrupted, or the interrupt may not be issued, for example, until the receiving thread begins executing with a priority less than or equal to the received thread.

Figure 5:
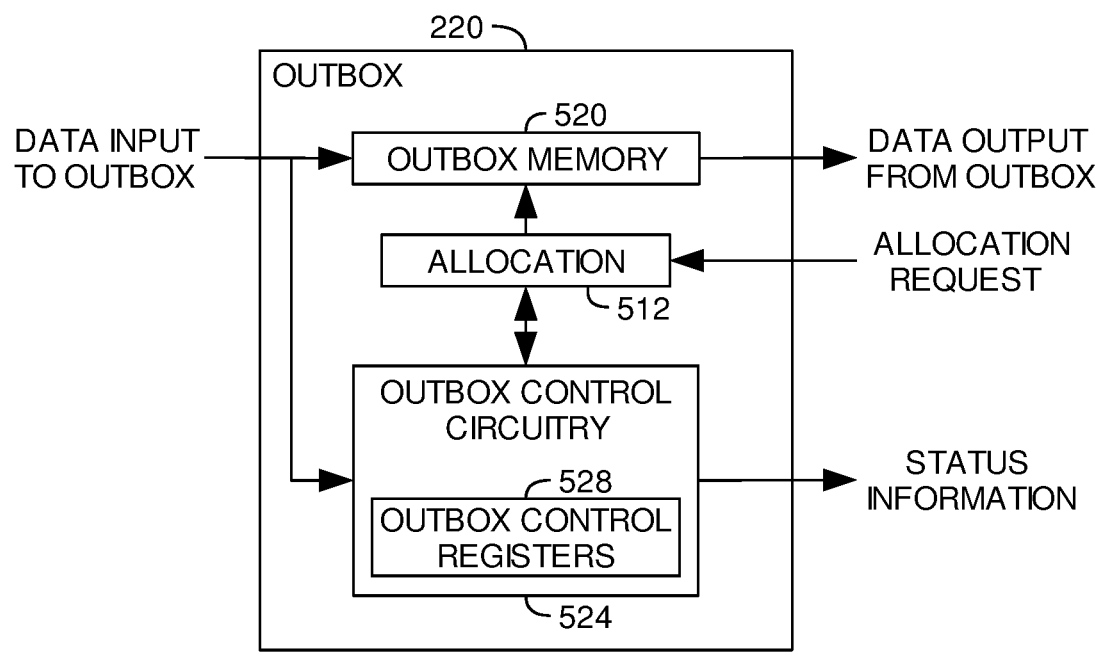
FIG. 5 is a block diagram depicting exemplary circuitry for accessing an outbox according to one embodiment of the invention.

FIG. 5 is a block diagram depicting exemplary circuitry for accessing an outbox according to one embodiment of the invention. As depicted, the outbox 220 may include an allocation register 512 which indicates how much of the outbox memory 520 has been allocated to packets being sent by the owner thread of the outbox 220. Each time the owner thread sends a packet, the owner thread may check the allocation register 512 (e.g., via a local read) to determine if the outbox memory 520 contains sufficient free space in which an outgoing packet may be placed. If the outbox 220 does contain sufficient space, then the sending owner thread may place the packet to be sent in the outbox memory 520 (e.g., via a local store) and the allocation register 512 may be incremented either by the sending thread or automatically by the outbox control circuitry 524 in response to the data being written.

In one embodiment, the outbox control circuitry 524 may be used to send the packet as described above. For example, the outbox control circuitry 524 may detect when a packet is written to the outbox memory 520 and, in response to detecting the packet, automatically send the packet. Optionally, the sending thread, after writing the packet to the outbox memory 520, may use the outbox control registers 528 to issue a command to the outbox control circuitry 524 to send the packet. In some cases, the outbox control circuitry may indicate the status of a packet being sent (e.g., successfully sent, pending, or unsuccessful) to the sending thread via the outbox control registers 528. As described above, access to the outbox control registers 524 may be provided to the sending thread via local reads and/or writes. The outbox control circuitry 524 may also be configured to decrement the allocation register 512 after a packet has been successfully sent. Furthermore, the outbox control circuitry 524 may be configured to generate an interrupt or exception to indicate to the sending thread whether an error occurred while sending a packet and/or whether a packet was successfully sent.

In general, packets sent via the outbox 220 may be managed in any manner known to those skilled in the art. For example, the outbox 220 may act as a first in, first out (FIFO) queue to send the oldest packets in the outbox first. Optionally, the outbox 220 may act as a stack (last in, first out), or the sending thread may assign priorities or packet numbers to each packet which may be used by the outbox control circuitry 524 in determining which packet to send first. Other information may also be provided to the outbox control circuitry 524 by the sending thread via the outbox control registers 528 or via the packet itself. Such information may include the number of attempts which should be made to send a given packet, the timeout which should be used when sending each packet (e.g., in waiting for a response), and other such information. Optionally, the outbox control circuitry 524 may be configured with predefined settings which are used in sending packets.

Further details and embodiments of communication using inboxes and outboxes are also described in U.S. patent application Ser. No. 11/567,874, entitled METHOD AND APPARATUS FOR MEMORY UTILIZATION filed Dec. 7, 2006, by Hoover et al., which is herein incorporated by reference in its entirety.

Context Switching Between Threads

As described above, when inbox circuitry 202 receives an incoming work packet, an interrupt may be generated which indicates that the work packet has been received. In one embodiment, when the interrupt is generated, a program referred to as a handler may be executed by the processor 102. The handler may, for example, be a kernel thread which performs actions such as calling one or more other threads to process the information provided by the received work packet. Where the processor 102 switches from executing one thread to executing another thread, the switch may be referred to as a context switch because each thread may execute in a different context, e.g., the data, instructions, and address translations for each thread may be different.

Figure 6:
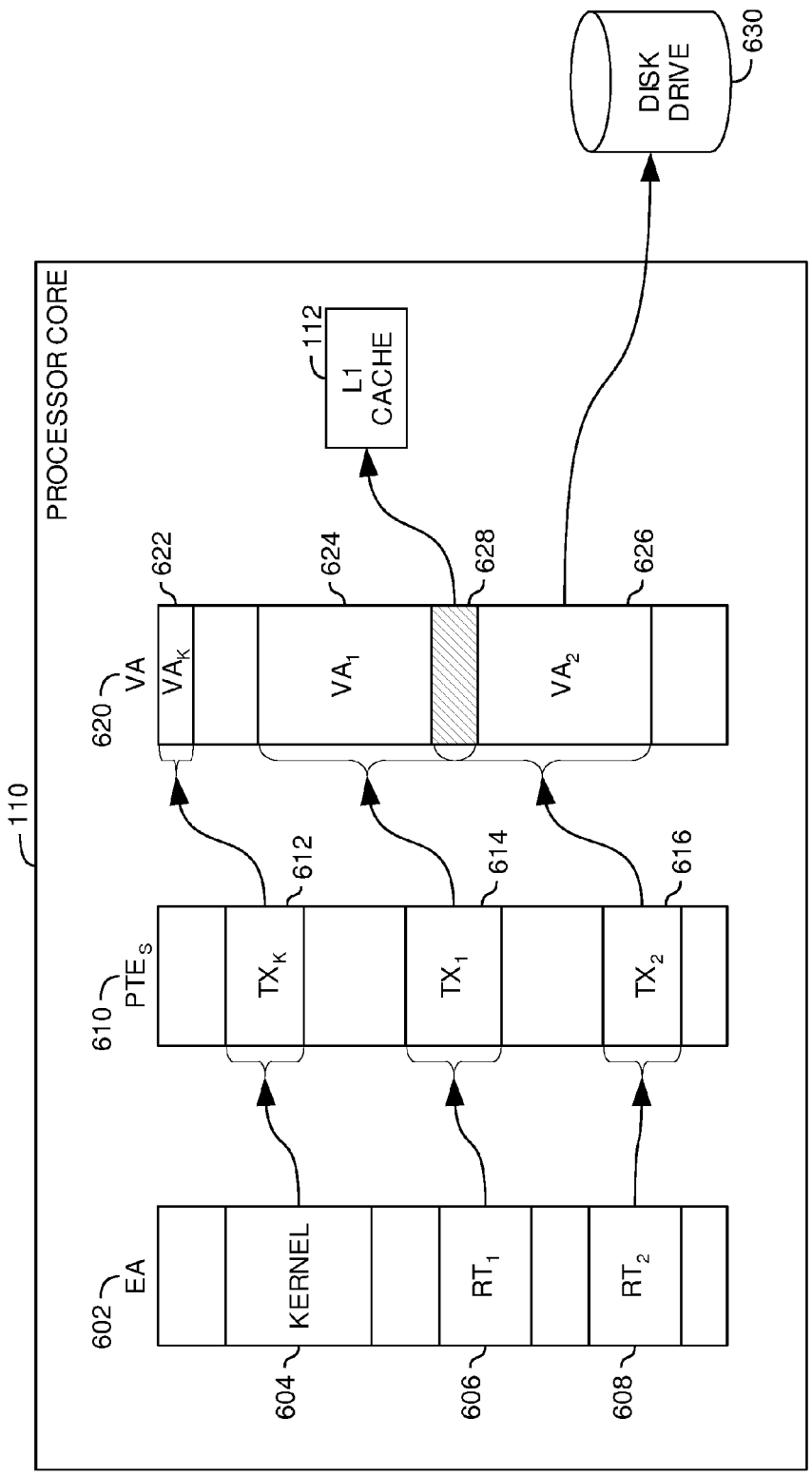
FIG. 6 is a block diagram depicting aspects of address translation according to one embodiment of the invention.

FIG. 6 is a block diagram depicting aspects of address translation for multiple threads 604, 606, 608, according to one embodiment of the invention. Each of the threads (the kernel thread 604 and the first and second ray-triangle intersection test threads RT1 606 and RT2 608) may operate using effective addresses in an effective address space 602. In one embodiment, the kernel thread 604 may be configured to receive interrupts or exceptions (e.g., from an inbox 202 in response to receiving a packet containing workload information). The kernel 604 may also be configured to poll an inbox to determine if a packet has been received. When an exception is detected, the kernel thread 604 may either handle the exception (e.g., the kernel thread 604 may be an exception handler) or call another thread which performs exception handling. For example, while processing the exception, the kernel thread 604 may call one of the RT threads 606, 608 to process the workload information contained in a received packet.

In one embodiment, page table entries (PTEs) 610 (a portion of which may be stored in the TLB 274 depicted in FIG. 2B) may be used to translate from the effective addresses for the kernel thread 604 to virtual addresses 620 which, in turn, correspond to real addresses of information stored, for example, in an L1 cache 112 or paged information on a disk drive 630. Thus, entries $TX_K$ 612 for the kernel 604 may translate to virtual addresses $VA_K$ 622 for the kernel 604, entries $TX_1$ 614 for $RT_1$ 606 may translate to virtual addresses $VA_1$, and entries $TX_2$ 616 for $RT_2$ 608 may translate to virtual addresses $VA_2$ 626.

In one embodiment, one or more of the threads 604, 606, 608 may also be configured to operate without address translation (referred to as untranslated or flat mode) for a portion of or for the entire time during which the thread is being executed. A thread may turn address translation on or off, for example, by executing an instruction which sets or clears a corresponding translation mode bit in a mode register for the processor core 110 which is executing the thread. Where address translation is turned off, the thread being executed by the processor core 110 may access information in the processor core 110 directly using real addresses while PTEs 610 for the thread (if any) may not be used for address translation.

In some cases, during context switching between different threads, different address translations used by each thread may result in errors during execution. For example, as depicted in FIG. 6, a portion 628 of the virtual addresses $VA_1$ 624 for $RT_1$ 606 may overlap with a portion of the virtual addresses $VA_2$ 626 for $RT_2$ 608. While $RT_1$ 606 is being executed, information corresponding to the virtual addresses $VA_1$ 624 for $RT_1$ 606 may be placed in the L1 cache 112. If the information for $RT_1$ 606 placed in the L1 cache 112 remains in the L1 cache 112 when address translation for $RT_2$ 608 is turned on, then $RT_2$ 608 may inadvertently attempt to access the information in the L1 cache 112 in the overlapping portion 628 of the virtual address spaces for $VA_1$ 624 and $VA_2$ 626. Thus, $RT_2$ 608 may access incorrect information (e.g., the information in the L1 cache 112 corresponding to $RT_1$ 606) while the actual information for $RT_2$ 608 is stored elsewhere, such as on disk drive 630.

In one embodiment, the processor 102 may be configured to prevent a first thread from incorrectly accessing information used by a second thread. For example, the processor 102 may include cache coherency circuitry which prevents the first thread from accessing information placed in the L1 cache 112 by the second thread and vice versa. However, in some cases, one or more threads 604, 404, 608 may operate with the cache coherency capabilities of the processor 102 disabled. For example, some threads may use software maintained coherency, wherein the software being executed by the threads attempts to ensure that one thread does not inadvertently access information for another thread.

In some cases, software maintained coherency may not prevent all errors which occur during context switching. For example, where instruction prefetching is performed using hardware prefetch circuitry 270, the software being executed may be incapable of detecting which instructions are being prefetched into the L1 cache 112. If the prefetch circuitry 270 prefetches instructions into the overlapping address space 628 between a first thread $RT_1$ 606 and a second thread $RT_2$ 608, then context switching errors may still occur, for example, if $RT_2$ 608 inadvertently accesses instructions which were prefetched for $RT_1$ 606 into the L1 cache 112 when $RT_2$ 608 begins operating with address translation enabled.

In one embodiment of the invention, context switching errors between a first thread and a second thread such as those described above may be prevented by executing one or more instructions which remove access to information in a cache for the first thread before switching to the second thread. Removing access to the information in the cache (e.g., in the L1 cache 112) may be performed, for example, by flushing the information from the cache or invalidating the information in the cache as appropriate. After access to the information has been removed, a subsequent attempt by the second thread to access the address for the information in the cache may cause a cache miss to occur, resulting in correct information for the second thread being retrieved (e.g., from the disk drive 630) using the address translation for the second thread.

Figure 7:
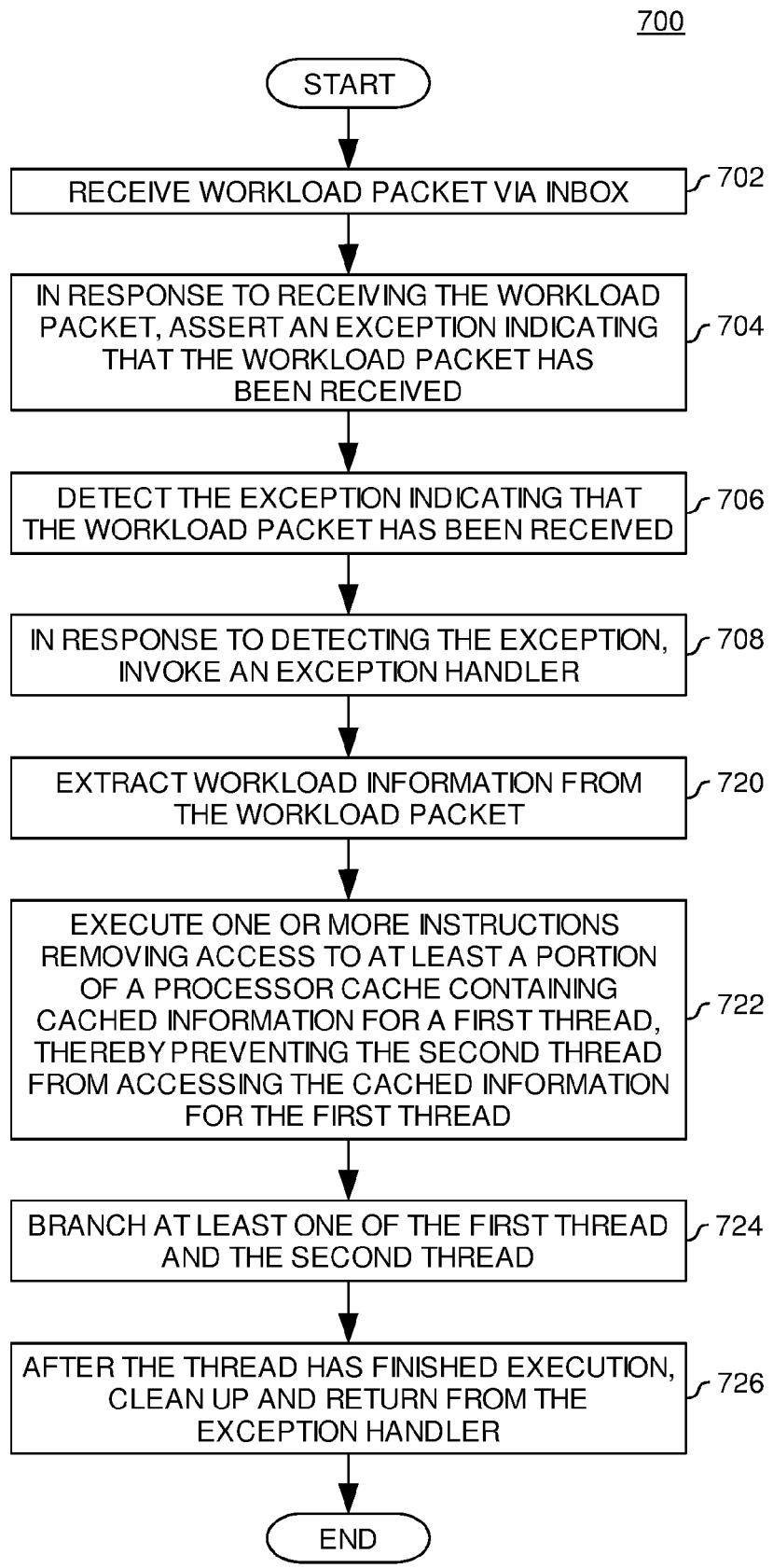
FIG. 7 is a flow diagram depicting a process for context switching between a first thread and a second thread according to one embodiment of the invention.

FIG. 7 is a flow diagram depicting a process 700 for context switching between a first thread and a second thread according to one embodiment of the invention. As depicted, the process 700 may begin at step 702 where a workload packet is received via inbox circuitry 202. In response to receiving the workload packet, an exception (e.g., interrupt) may be asserted indicating that the workload packet has been received at step 704. The exception indicating that the workload packet has been received may be detected at step 706, for example, by circuitry in the processor core 110 in which the workload packet is received. At step 708, in response to detecting the exception, an exception handler (e.g., the kernel thread 604) may be invoked, for example, by the processor core 110.

At step 720, the exception handler may extract workload information from the workload packet, for example, in order to determine both whether to call a thread to process the workload packet and which thread should be called to process the workload packet. At step 722, one or more instructions may be executed by the exception handler which remove access to at least a portion of the processor cache containing information for a first thread. For example, the exception handler may execute the instructions in the processor core 110 which invoked the exception handler. Upon executing the instructions, the processor core 110 may remove access to (e.g., flush or invalidate) at least a portion of the L1 cache 112. In one embodiment, the entire L1 cache 112 may be invalidated or flushed. Optionally, a portion of the L1 cache 112 may be invalidated or flushed.

By removing access to the portion of the processor cache, a second thread (e.g., one called by the exception handler to process the received workload packet) may be prevented from accessing the cached information for the first thread in the processor cache. For example, as described above, if the second thread does attempt to access addresses in the L1 cache 112 (e.g., in an overlapping portion 628 of the virtual address spaces $VA_1$ 624 and $VA_2$ 626), a cache miss may occur. When the cache miss occurs, correct information for the second thread may be fetched, for example, from the disk drive 630. At step 724, the exception handler may branch to (e.g., call) one of the first thread and the second thread. Then, at step 726, after the first thread or the second thread has processed the received workload packet, the exception handler may perform a clean up routine (e.g., releasing any unused memory and resetting any settings changed while handling the exception) and return.

In general, embodiments of the invention may be utilized where the process 700 described above is performed with additional or with fewer steps than those depicted in FIG. 7. Furthermore, the order of the steps depicted and described is merely an exemplary order in which the steps may be performed, and is not intended to be limiting of the invention. For example, as described below, where the exception handler calls the first thread, the exception handler may execute the one or more instructions removing access to information in the cache for the first thread after the first thread is called. When the exception handler is subsequently called and branches to the second thread, the cache will have already been cleared and the second thread may be executed without any errors occurring. Optionally, where the exception handler calls the second thread, the exception handler may execute the one or more instructions removing access to information in the cache for the first thread before the second thread is called, thereby preventing any errors from occurring when the second thread is called.

Figure 8A:
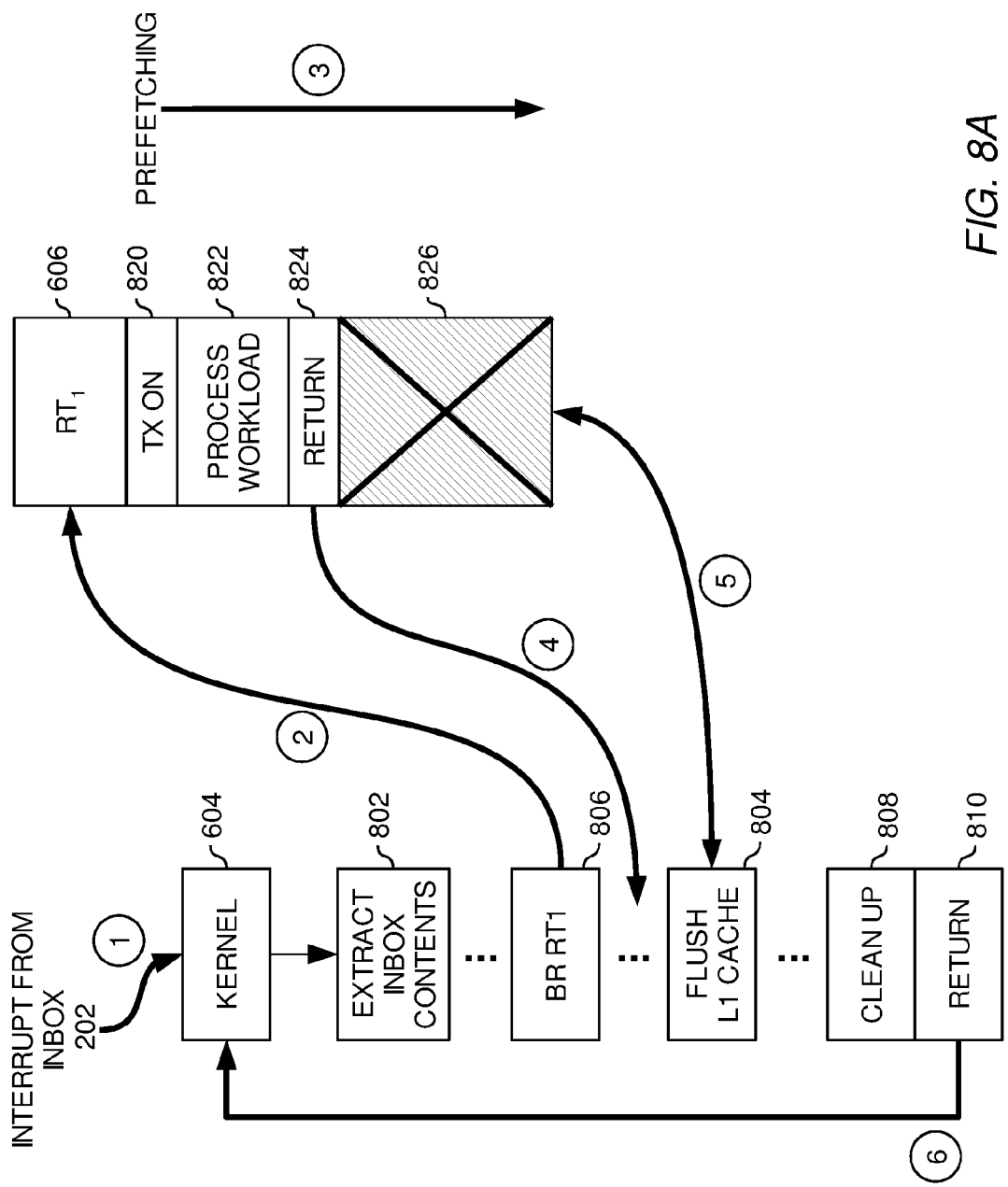
FIGS. 8A-D are block diagrams depicting aspects of an exception handler program according to one embodiment of the invention.
Figure 8B:
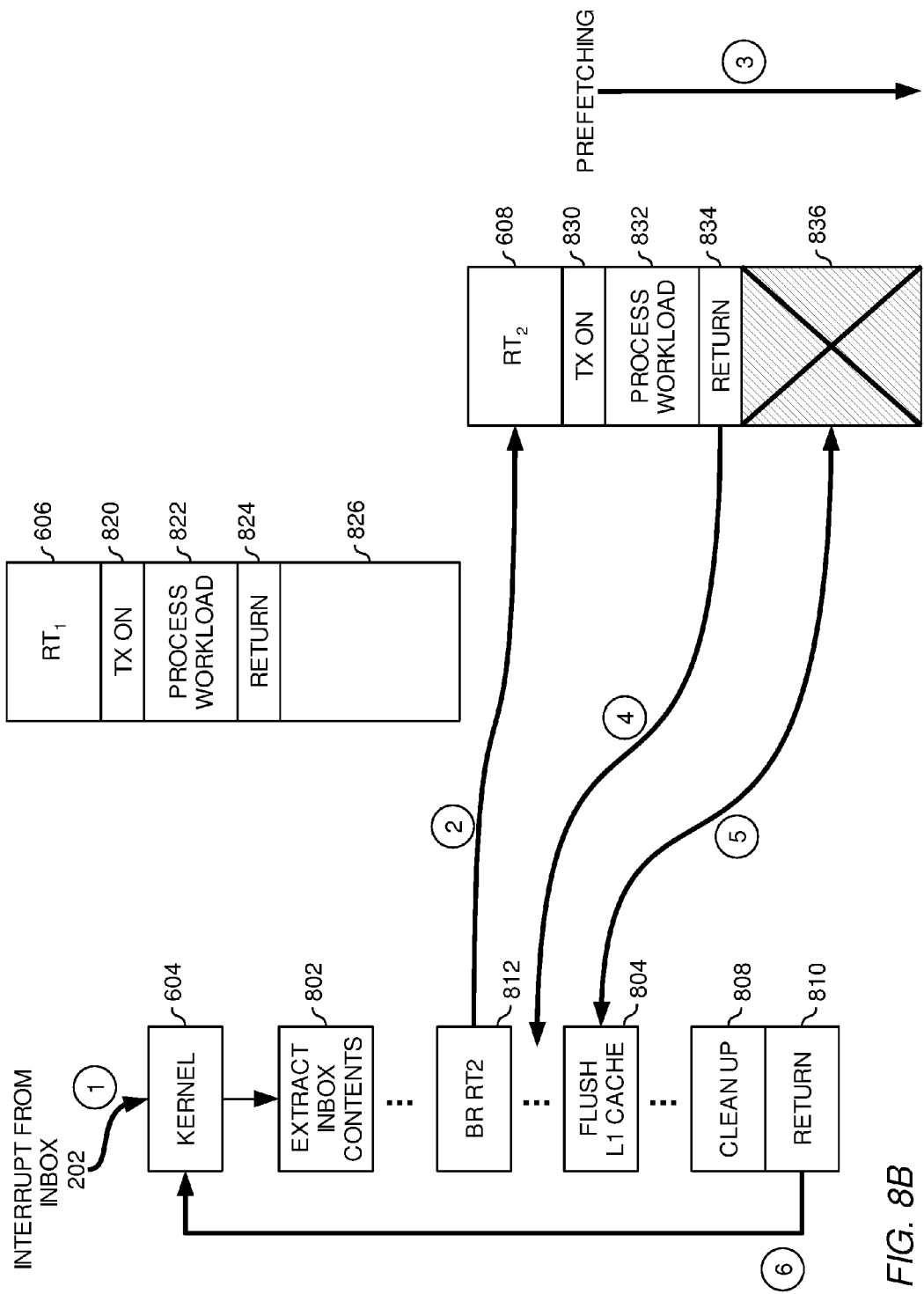
Figure 8C:
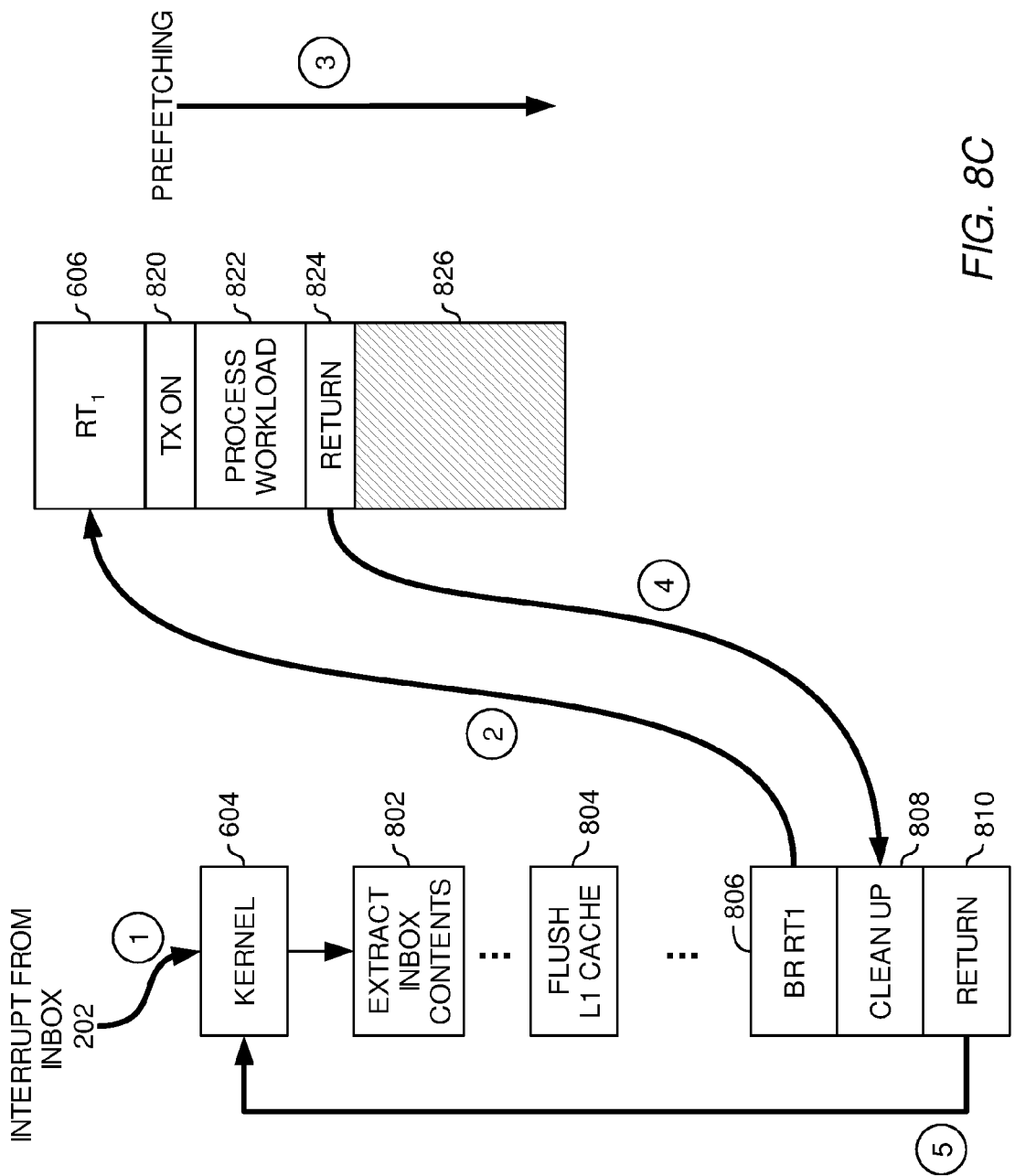
Figure 8D:
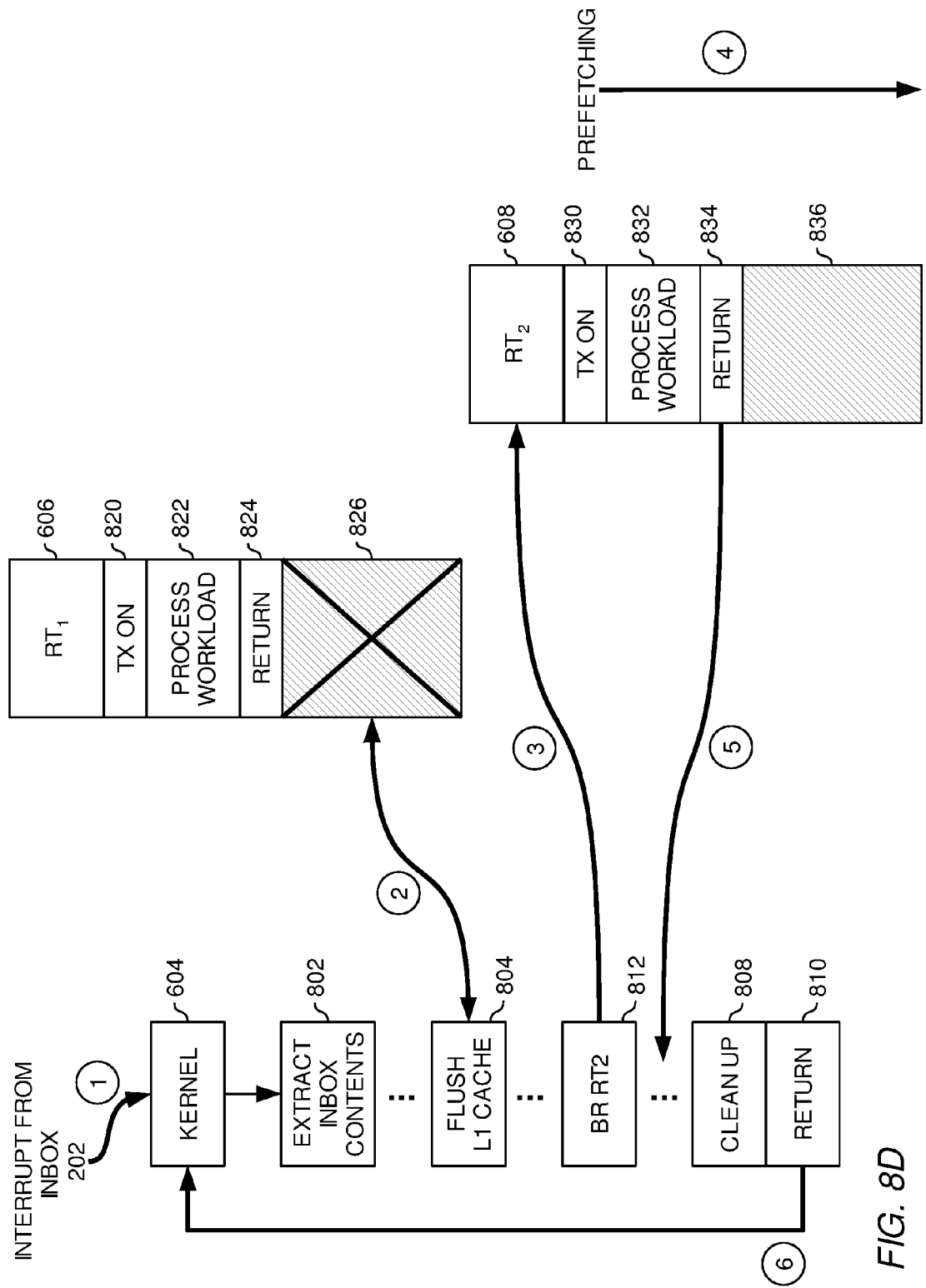

FIGS. 8A-D are block diagrams depicting aspects of an exception handler according to one embodiment of the invention. As described below, FIGS. 8A-B depict an embodiment of the exception handler (the kernel thread 604) wherein the L1 cache 112 is flushed after calling a thread to process a received packet. FIGS. 8C-D depict an embodiment of the exception handler wherein the L1 cache 112 is flushed before calling a thread to process the received packet.

As depicted in FIG. 8A, the kernel 604 may begin (1) (or continue, where the kernel is quiesced or looping) execution when an interrupt is received from an inbox 202. The kernel 604 may include instructions 802 which then extract the inbox contents (e.g., a workload packet received by the inbox 202). The kernel 604 may then execute an instruction (BR $RT_1$) 806 which branches (2) to $RT_1$ 606. $RT_1$ 606 may then execute an instruction 820 which turns address translation on (TX On) and execute instructions 822 which process the workload of the received packet. While $RT_1$ 606 is executing instructions, the prefetch circuitry 270 may be prefetching (3) instructions 826 into the L1 cache 112. However, before the prefetched instructions 826 are executed by $RT_1$ 606, $RT_1$ 606 may finish processing the workload and execute an instruction 824 returning (4) to the kernel 604. The kernel 604 may then execute one or more instructions 804 which flush (5) the prefetched instructions 826 from the L1 cache 112. The kernel 604 may then execute one or more instructions 808, 810 which clean up and return (6) (e.g., the kernel 604 may loop, quiesce, or call another thread).

FIG. 8B is a block diagram depicting an exemplary situation where the kernel 604 receives a second interrupt (e.g., after processing the interrupt as described with respect to FIG. 8A) and calls the second thread $RT_2$ 608 according to one embodiment of the invention. As described above, the kernel 604 may begin (1) execution when the interrupt is received from the inbox 202. The kernel 604 may then extract the inbox contents and execute an instruction (BR $RT_2$) 806 which branches (2) to $RT_2$ 608 (instructions 802, 812). $RT_2$ 608 may then execute an instruction 830 which turns address translation on (TX On).

As described above with respect to FIG. 8A, because the instructions 826 prefetched when $RT_1$ 606 was previously executed were flushed from the L1 cache 112 (e.g., during the previous execution of the kernel 604), $RT_2$ 608 may be prevented from incorrectly executing those instructions when address translation is turned on by instruction 830. $RT_2$ 608 may then execute instructions 832 which process the workload of the received packet. While $RT_2$ 608 is executing instructions, the prefetch circuitry 270 may be prefetching (3) instructions 836 into the L1 cache 112. $RT_2$ 608 may then finish processing the workload and execute an instruction 834 returning (4) to the kernel 604. The kernel 604 may then execute one or more instructions 804 also flushing (5) the prefetched instructions 836 for $RT_2$ 608 from the L1 cache 112. The kernel 604 may then execute one or more instructions 808, 810 which clean up and return (6).

FIGS. 8C-D depict an embodiment of the exception handler wherein the L1 cache 112 is flushed by instructions 804 before calling (2) a thread $RT_1$ 606 to process a received packet. Thus, in FIG. 8C, when the kernel 604 returns (6), prefetched instructions 826 for $RT_1$ 606 may remain in the L1 cache 112. However, as depicted in FIG. 8D, before the kernel 604 calls (3) $RT_2$ 608 at instruction 806, the kernel 604 may execute the one or more instructions 804 flushing (2) the prefetched instructions 826 from the L1 cache 112, thereby preventing $RT_2$ 608 from inadvertently executing those instructions 826 when address translation is turned on (instruction 830).

While described above in FIGS. 8A-D with respect to flushing the L1 cache 112, embodiments of the invention may also be used where access to information in the L1 cache 112 is prevented by invalidating the data. Furthermore, as previously mentioned, in some cases, the entire L1 cache may be flushed or invalidated, while in other cases, only a portion of the L1 cache 112 may be flushed or invalidated. In one embodiment, where prefetching is performed, only information prefetched by the processor core 110 and placed in the L1 cache 112 without being executed may be flushed or invalidated from the L1 cache 112. For example, the exception handler may be configured to determine which information was prefetched by the prefetch circuitry 270 by examining one or more registers identifying the prefetched information (e.g., the registers may indicate cache lines or address ranges to be flushed or invalidated). Optionally, the exception handler may flush or invalidate instructions beginning at the address of the last instruction executed by the returning thread (e.g., the address of the return instructions 824, 834). Also, while described above with respect to a processor 102 which may have cache coherency capabilities which may be enabled or disabled, embodiments of the invention may also be used where the processor 102 does not provide any hardware for automatically maintaining cache coherency.

While the foregoing is directed to embodiments of the present invention, other and further embodiments of the invention may be devised without departing from the basic scope thereof, and the scope thereof is determined by the claims that follow.

What is claimed is:

1. A method for context switching between a first thread and a second thread, comprising:
   detecting an exception, wherein the exception is generated in response to receiving a packet of information directed to one of the first thread and the second thread; and
   in response to detecting the exception, invoking an exception handler, wherein the exception handler is configured to:
      execute one or more instructions removing access to at least a portion of a processor cache of a processor, wherein the portion of the processor cache contains cached information for the first thread using a first address translation, thereby preventing the second thread using a second address translation from accessing the cached information in the processor cache; and
      branch to at least one of the first thread and the second thread;
   wherein both the first thread and the second thread access the processor cache with software maintained coherency such that the processor is not configured to automatically remove access to the portion of the processor cache without executing the one or more instructions; and
   wherein the first address translation includes a memory coherency bit which indicates that the cached information does not use hardware maintained coherency.

2. The method of claim 1, wherein the exception handler is configured to:
   branch to the first thread; and
   after branching to the first thread, execute the one or more instructions removing access to the portion of the processor cache containing information for the first thread.

3. The method of claim 1, wherein the exception handler is configured to:
   before branching to the second thread, execute the one or more instructions removing access to the portion of the processor cache containing information for the first thread; and branch to the second thread.

4. The method of claim 1, wherein the cached information for the first thread includes one or more instructions prefetched by the processor.

5. The method of claim 1, wherein the exception is generated by circuitry configured to automatically receive the packet of information and place the received packet of information in a protected area of memory in the processor without executing any instructions.

6. The method of claim 1, wherein removing access to the portion of the processor cache of the processor comprises at least one of invalidating the portion of the processor cache and flushing the portion of the processor cache.

7. A computer-readable storage medium including instructions, which, when executed by a processor, are configured to perform an operation comprising:
   detecting an exception; and in response to detecting the exception, invoking an exception handler, wherein the exception handler is configured to:
  execute one or more instructions removing access to at least a portion of a processor cache, wherein the portion of the processor cache contains cached information for a first thread using a first address translation, thereby preventing a second thread using a second address translation from accessing the cached information in the processor cache; and
  branch to at least one of the first thread and the second thread;
wherein both the first thread and the second thread access the processor cache with software maintained coherency such that the processor is not configured to automatically remove access to the portion of the processor cache without executing the one or more instructions; and
wherein the first address translation includes a memory coherency bit which indicates that the cached information does not use hardware maintained coherency.

8. The computer-readable storage medium of claim 7, wherein the exception handler is configured to:
  branch to the first thread; and
  after branching to the first thread, execute the one or more instructions removing access to the portion of the processor cache containing information for the first thread.

9. The computer-readable storage medium of claim 7, wherein the exception handler is configured to:
  before branching to the second thread, execute the one or more instructions removing access to the portion of the processor cache containing information for the first thread; and
  branch to the second thread.

10. The computer-readable storage medium of claim 7, wherein the cached information for the first thread includes one or more instructions prefetched by the processor.

11. The computer-readable storage medium of claim 7, wherein the exception is generated by circuitry configured to automatically receive the packet of information and place the received packet of information in a protected area of memory in the processor without executing any instructions.

12. The computer-readable storage medium of claim 7, wherein removing access to the portion of the processor cache comprises at least one of invalidating the portion of the processor cache and flushing the portion of the processor cache.

13. A computer system comprising:
  a computer-readable storage medium including one or more instructions;
  a processor comprising:
    a processor cache; and
    circuitry, which, when executing the one or more instructions, is configured to:
      detect an exception; and
      in response to detecting the exception, invoke an exception handler, wherein the exception handler is configured to:
        execute one or more instructions removing access to at least a portion of the processor cache, wherein the portion of the processor cache contains cached information for a first thread using a first address translation, thereby preventing a second thread using a second address translation from accessing the cached information in the processor cache; and
        branch to at least one of the first thread and the second thread;
      wherein both the first thread and the second thread access the processor cache with software maintained coherency such that the processor is not configured to automatically remove access to the portion of the processor cache without executing the one or more instructions; and
      wherein the first address translation includes a memory coherency bit which indicates that the cached information does not use hardware maintained coherency.

14. The computer system of claim 13, wherein the exception handler is configured to:
  branch to the first thread; and
  after branching to the first thread, execute the one or more instructions removing access to the portion of the processor cache containing information for the first thread.

15. The computer system of claim 13, wherein the exception handler is configured to:
  before branching to the second thread, execute the one or more instructions removing access to the portion of the processor cache containing information for the first thread; and
  branch to the second thread.

16. The computer system of claim 13, wherein the cached information for the first thread includes one or more instructions prefetched by the processor.

17. The computer system of claim 13, wherein the processor further comprises inbox circuitry configured to:
  generate the exception automatically in response to receiving the packet of information; and
  place the received packet of information in a protected area of memory in the processor without executing any instructions.

18. The computer system of claim 13, wherein removing access to the portion of the processor cache comprises at least one of invalidating the portion of the processor cache and flushing the portion of the processor cache.

* * * * *